US007188170B1

(12) United States Patent
Burnley et al.

(10) Patent No.: US 7,188,170 B1
(45) Date of Patent: *Mar. 6, 2007

(54) SYSTEM FOR MANAGING RESOURCES

(75) Inventors: Christopher Burnley, Daly City, CA (US); Brian Gerhold, Los Gatos, CA (US); Wei Zheng, El Cerrito, CA (US); Pamela Day, San Francisco, CA (US); Mike Sherman, Redwood City, CA (US)

(73) Assignee: Blazent, Inc., San Mateo, CA (US)

( * ) Notice: Subject to any disclaimer, the term of this patent is extended or adjusted under 35 U.S.C. 154(b) by 652 days.

This patent is subject to a terminal disclaimer.

(21) Appl. No.: 10/136,177

(22) Filed: May 1, 2002

Related U.S. Application Data

(63) Continuation of application No. 10/135,864, filed on Apr. 29, 2002, now Pat. No. 6,782,350.

(60) Provisional application No. 60/286,814, filed on Apr. 27, 2001.

(51) Int. Cl.
*G06F 15/173* (2006.01)
*H04M 11/00* (2006.01)

(52) U.S. Cl. .................. 709/224; 710/18; 702/186; 702/188

(58) Field of Classification Search ............... 709/224, 709/201, 203, 217, 219, 223; 710/1, 15, 710/17, 18; 455/405; 725/9; 702/188, 186
See application file for complete search history.

(56) References Cited

U.S. PATENT DOCUMENTS

| 4,554,418 A | 11/1985 | Toy |
| 5,063,523 A | 11/1991 | Vrenjak |
| 5,463,775 A | 10/1995 | DeWitt et al. |
| 5,504,921 A | 4/1996 | Dev et al. |
| 5,506,955 A | 4/1996 | Chen et al. |
| 5,623,598 A | 4/1997 | Voigt et al. |
| 5,627,766 A | 5/1997 | Beaven |
| 5,650,940 A | 7/1997 | Tonozuka et al. |

(Continued)

OTHER PUBLICATIONS

Three desktop screen printouts of "Add or Remove Programs" in Microsoft Windows XP (Continued)

*Primary Examiner*—Bharat Barot
*Assistant Examiner*—V. Korobov
(74) *Attorney, Agent, or Firm*—Moser IP Law Group

(57) ABSTRACT

Some embodiments of the invention provide a system for tracking utilization of resources of computers. This system includes several client computers, where each computer has one or more resources that the system tracks. The system also includes a client application for each client computer. Each client application collects utilization duration data relating to the utilization of the resources of its corresponding client computer. The system further includes an application server that receives the utilization duration data collected by the client applications and stores the received data in a storage structure. In certain embodiments, the collected duration data includes time periods that the client applications measure. The application server then aggregates and/or stores the collected time periods. One of ordinary skill will realize that in other embodiments the client applications might report raw duration data (such as start and end times) from which the application server generates the appropriate time periods.

12 Claims, 28 Drawing Sheets

U.S. PATENT DOCUMENTS

| | | | | |
|---|---|---|---|---|
| 5,675,789 | A | 10/1997 | Ishii et al. | |
| 5,717,604 | A * | 2/1998 | Wiggins | 709/229 |
| 5,727,129 | A | 3/1998 | Barrett et al. | |
| 5,751,965 | A | 5/1998 | Mayo et al. | |
| 5,778,182 | A * | 7/1998 | Cathey et al. | 709/219 |
| 5,781,735 | A | 7/1998 | Southard | |
| 5,796,952 | A | 8/1998 | Davis et al. | |
| 5,819,028 | A | 10/1998 | Manghirmalani et al. | |
| 5,884,072 | A | 3/1999 | Rasmussen | |
| 5,913,032 | A | 6/1999 | Schwartz et al. | |
| 5,920,701 | A | 7/1999 | Miller et al. | |
| 5,944,782 | A | 8/1999 | Noble et al. | |
| 5,949,415 | A * | 9/1999 | Lin et al. | 715/740 |
| 5,978,611 | A | 11/1999 | Yamamoto et al. | |
| 5,987,514 | A | 11/1999 | Rangarajan | |
| 5,991,881 | A | 11/1999 | Conklin et al. | |
| 5,999,179 | A * | 12/1999 | Kekic et al. | 715/734 |
| 6,003,027 | A | 12/1999 | Prager | |
| 6,014,502 | A | 1/2000 | Moraes | |
| 6,052,722 | A | 4/2000 | Taghadoss | |
| 6,057,757 | A | 5/2000 | Arrowsmith et al. | |
| 6,064,304 | A | 5/2000 | Arrowsmith et al. | |
| 6,070,190 | A | 5/2000 | Reps et al. | |
| 6,078,956 | A | 6/2000 | Bryant et al. | |
| 6,108,701 | A * | 8/2000 | Davies et al. | 709/224 |
| 6,112,240 | A | 8/2000 | Pogue et al. | |
| 6,115,393 | A | 9/2000 | Engel et al. | |
| 6,118,936 | A | 9/2000 | Lauer et al. | |
| 6,122,663 | A * | 9/2000 | Lin et al. | 709/224 |
| 6,138,155 | A | 10/2000 | Davis et al. | |
| 6,144,993 | A | 11/2000 | Fukunaga et al. | |
| 6,167,538 | A | 12/2000 | Neufeld et al. | |
| 6,182,133 | B1 | 1/2001 | Horvitz | |
| 6,185,567 | B1 | 2/2001 | Ratnaraj et al. | |
| 6,205,563 | B1 | 3/2001 | Lewis | |
| 6,209,033 | B1 | 3/2001 | Datta | |
| 6,256,620 | B1 | 7/2001 | Jawahar et al. | |
| 6,270,034 | B1 | 8/2001 | Kury et al. | |
| 6,279,016 | B1 | 8/2001 | De Vorchik et al. | |
| 6,389,403 | B1 * | 5/2002 | Dorak, Jr. | 705/52 |
| 6,397,359 | B1 | 5/2002 | Chandra et al. | |
| 6,430,711 | B1 | 8/2002 | Sekizawa | |
| 6,497,469 | B1 | 12/2002 | Shinada et al. | |
| 6,536,037 | B1 * | 3/2003 | Guheeen et al. | 717/151 |
| 6,539,419 | B2 | 3/2003 | Beck et al. | |
| 6,553,336 | B1 * | 4/2003 | Johnson et al. | 702/188 |
| 6,606,657 | B1 * | 8/2003 | Zilberstein et al. | 709/224 |
| 6,625,843 | B2 | 9/2003 | Colby et al. | |
| 6,629,401 | B1 | 10/2003 | Hins et al. | |
| 6,754,470 | B2 * | 6/2004 | Hendrickson et al. | 455/67.11 |
| 6,769,019 | B2 | 7/2004 | Ferguson | |
| 6,839,680 | B1 * | 1/2005 | Liu et al. | 705/10 |
| 6,879,994 | B1 * | 4/2005 | Matsliach et al. | 709/204 |
| 6,895,437 | B1 | 5/2005 | Cowdrey et al. | |
| 6,961,000 | B2 | 11/2005 | Chung | |
| 6,978,303 | B1 * | 12/2005 | McCreesh et al. | 709/224 |
| 7,020,690 | B1 | 3/2006 | Haitsuka et al. | |
| 2001/0037407 | A1 * | 11/2001 | Dragulev et al. | 709/250 |
| 2001/0047406 | A1 * | 11/2001 | Araujo et al. | 709/223 |
| 2002/0026507 | A1 | 2/2002 | Sears et al. | |
| 2002/0055875 | A1 | 5/2002 | Bracewell et al. | |
| 2002/0069197 | A1 | 6/2002 | Katayama et al. | |
| 2002/0069363 | A1 | 6/2002 | Winburn | |
| 2002/0099818 | A1 | 7/2002 | Russell et al. | |
| 2002/0116249 | A1 * | 8/2002 | Ellinger et al. | 705/10 |
| 2003/0149581 | A1 * | 8/2003 | Chaudhri et al. | 705/1 |
| 2003/0149765 | A1 | 8/2003 | Hubbard et al. | |
| 2004/0039504 | A1 | 2/2004 | Coffee et al. | |
| 2005/0108769 | A1 | 5/2005 | Arnold et al. | |
| 2005/0198239 | A1 | 9/2005 | Hughes | |

OTHER PUBLICATIONS

Product description of Flexbill software by Macrovision, pp. 1-5.

U.S. Appl. No. 10/135,864, filed Apr. 29, 2002, Christopher Burnley et al.

U.S. Appl. No. 10/136,178, filed May 1, 2002, Christopher Burnley et al.

U.S. Appl. No. 10/136,184, filed May 1, 2002, Christopher Burnley et al.

U.S. Appl. No. 10/144,446, filed May 12, 2002, Christopher Burnley et al.

U.S. Appl. No. 10/144,655, filed May 12, 2002, Christopher Burnley et al.

Polk, Cathy Eichholz. "Webwatch: Visualizing Web Page Histories and Social Monitoring Habits." *Conference on Human Factors in Computing Systems*. Poster Session. pp. 393-394. ACM Press. Mar. 2001.

Jenkins, Ron. "Why Web-based Network Monitoring? Leveraging the Platform." *International Journal of Network Management*. May 1999. John Wiley & Sons. pp. 175-183.

Feather, Frank, et al. "Fault Detection in an Ethernet Network Using Anomaly Signature Matching." *Conference Proceedings on Communications Architectures, Protocols and Applications*. ACM Press. pp. 279-288. 1993.

Fuller, Wayne. "Network Management Using Exert Diagnostics." *International Journal of Network Management*. vol. 9, Issue 4, pp. 199-208, John Wiley & Sons, Ltd. Jul.-Aug. 1999.

Papavassilliou, Symeon. "Network and service management for wide-area electronic commerce networks." *International Journal of Network Management*. vol. 11, Issue 2, pp. 75-90. John Wiley & Sons, Ltd. Mar.-Apr. 2001.

\* cited by examiner

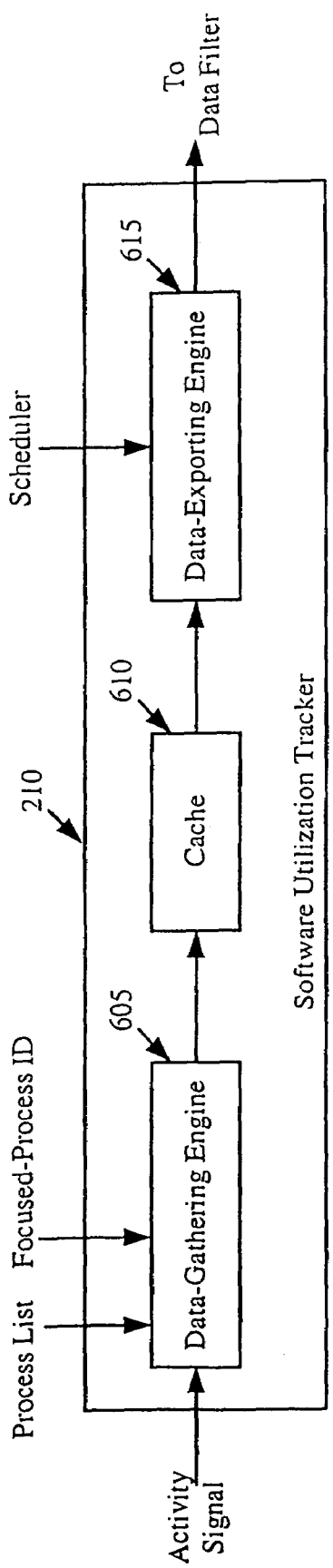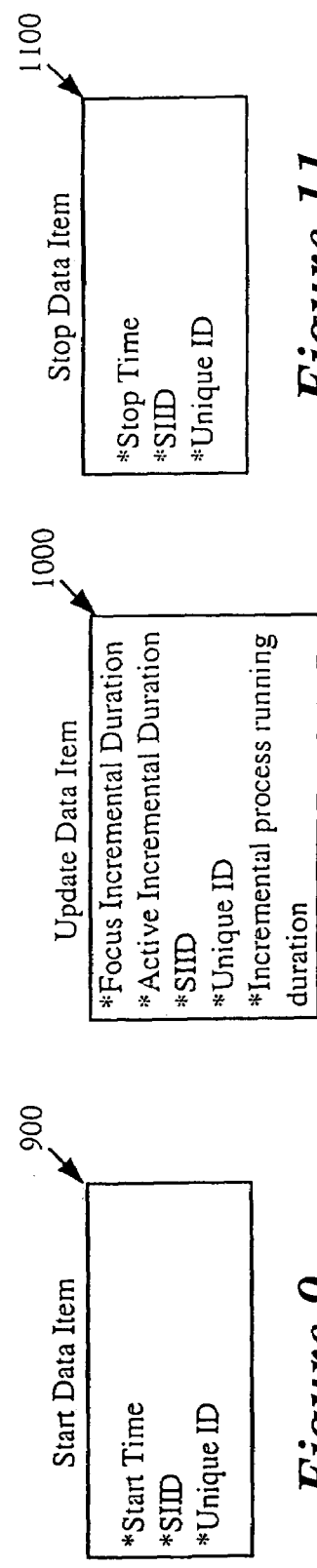

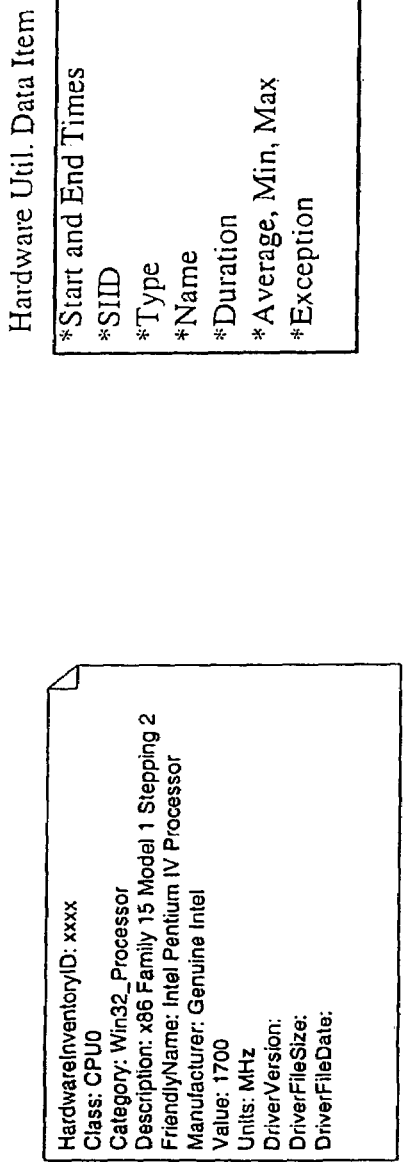
*Figure 19*
*Figure 24*
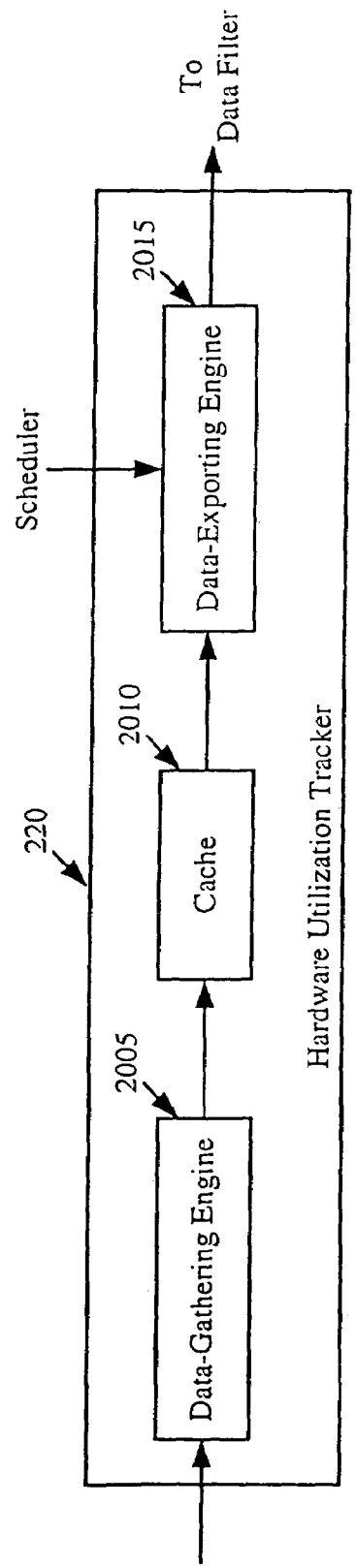
*Figure 20*

SYSTEM FOR MANAGING RESOURCES

CROSS REFERENCE TO RELATED APPLICATIONS

This application is a continuation application of U.S. patent application Ser. No. 10/135,864, entitled "Method and Apparatus for Managing Resources," filed on Apr. 29, 2002, now U.S. Pat. No. 6,782,350, which issued Aug. 24, 2004 and which application claims the benefit of U.S. Provisional Patent Application Ser. No. 60/286,814, filed Apr. 27, 2001, both disclosures of which are incorporated herein by reference in their entirety.

FIELD OF THE INVENTION

The present invention is directed towards method and apparatus for managing resources.

BACKGROUND OF THE INVENTION

In the last few years, there has been a dramatic increase in the number of computers that are used in business and residential environments. The use of computers, however, is not well understood. This is because currently there are few mechanisms for gathering data relating to the hardware and software resources of computers and to the usage of these resources. There are even fewer mechanisms for analyzing any such data.

Therefore, there is a need in the art for a system that gathers data relating to the hardware and software resources of one or more computer and gathers data relating to the usage of these resources. In addition, there is a need for a system that filters and analyzes such data, in order to provide a better understanding of the resources employed by the computers and the usage of these resources.

SUMMARY OF THE INVENTION

Some embodiments of the invention provide a method for tracking the use of software resources of a computer. This method identifies an instance when a particular software resource is used. It then measures and records a time period relating to the detected utilization of the software resource. In some embodiments, this time period is an estimated duration of the utilization of the software resource.

BRIEF DESCRIPTION OF THE DRAWINGS

The novel features of the invention are set forth in the appended claims. However, for purpose of explanation, several embodiments of the invention are set forth in the following figures.

FIG. 6 presents a conceptual illustration of a software utilization tracker of some embodiments.

FIGS. 9–11 illustrate the attributes of start, update, and stop software-utilization data items in some embodiments of the invention.

FIG. 19 illustrates an example of an add inventory data item for a CPU.

FIG. 20 illustrates a hardware utilization tracker of some embodiments of the invention.

FIG. 24 illustrates the attributes of a hardware-utilization data item in some embodiments.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

I. System Architecture

Figure 1:
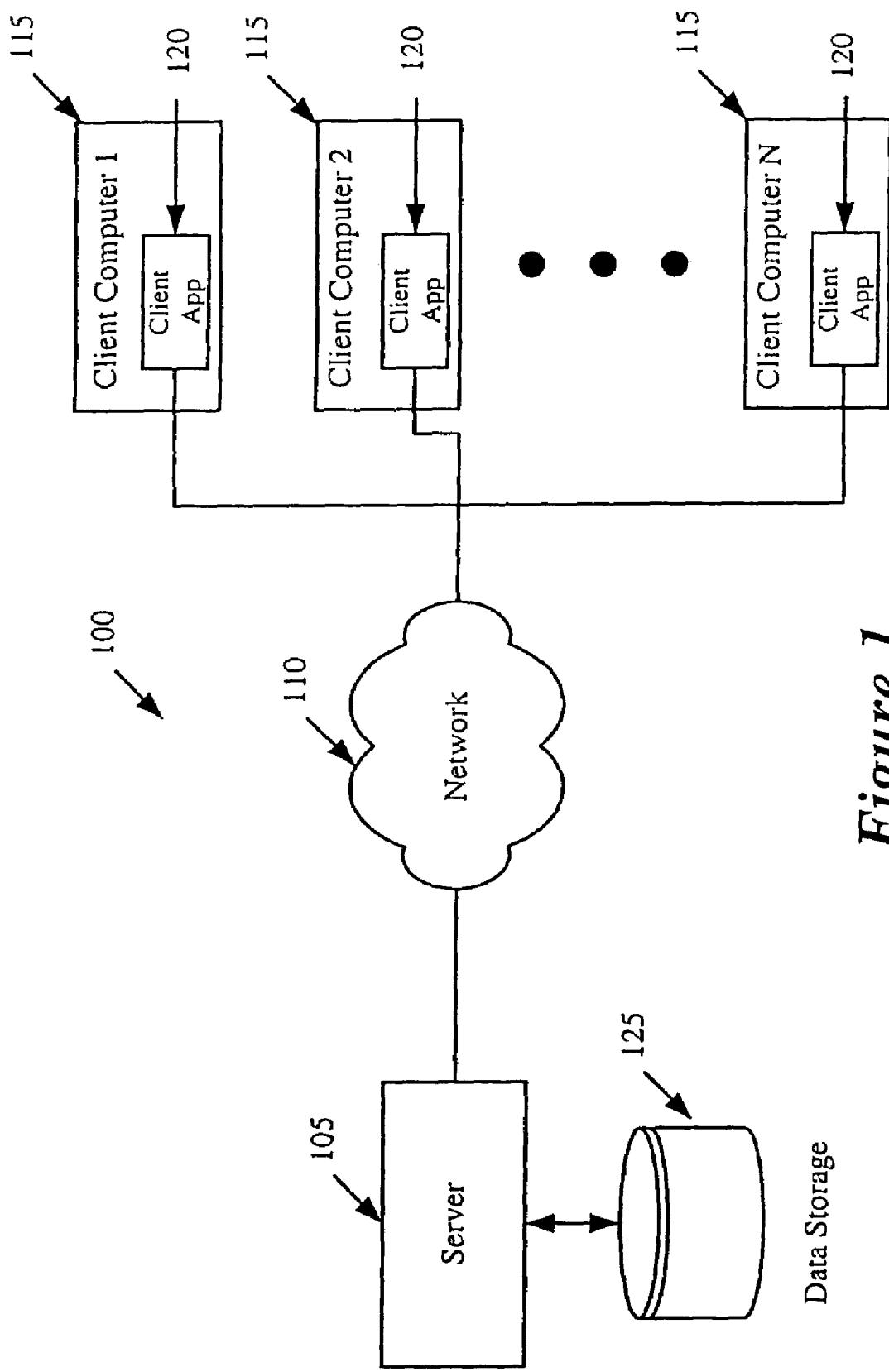
FIG. 1 presents a block diagram that conceptually illustrates one embodiment of the invention.

FIG. 1 presents a block diagram that conceptually illustrates one embodiment of the invention. This embodiment is a resource measurement system (RMS) 100 that is designed to provide visibility and insight into utilization of computer resources. The RMS 100 uses a client-server architecture. Hence, it includes a server 105, a network 110, and several client computers 115. It also includes a data storage 125.

Each client computer is a computing device, such as a server computer, a desktop computer, a laptop computer, a personal digital assistant ("PDA"), a network device, etc. In the embodiment illustrated in FIG. 1, each client computer includes a client application 120 that gathers certain information regarding the resources of its client computer and the usage of these resources. In some embodiments, each client application 120 is automatically loaded onto its client computer from the server 105 when its client computer is first introduced in the client-server environment. One example of a client application 120 is further described below in Section II.

The client applications 120 relay the data that they gather to the server 105 through the network 110. This network can be a local area network ("LAN"), a wide area network ("WAN"), or a network of networks (such as the Internet). The server 105 processes the data that it receives from the client applications. For instance, it might filter, combine, and/or categorize the received data. It then stores the received data in a data storage 125. The server then analyzes the data in the data storage and generates reports based on this data. The analysis and reporting can be done in an automated fashion. Alternatively, the analysis and/or reporting might be done by an administrator or at the direction of the administrator.

In some embodiments, one computer forms the server 105 and its data storage 125. Alternatively, in other embodiments, several computers form the server and/or its data storage. For instance, in some embodiments, one or more server computers are used to gather data from the client applications, one or more data storage computer systems are used as the data storage, and one or more server computers are used to analyze and generate reports based on the data stored in the data storage. The server 105 and its data storage are further described below in Section III for some embodiments of the invention.

II. Client Application

A. Architecture

Figure 2:
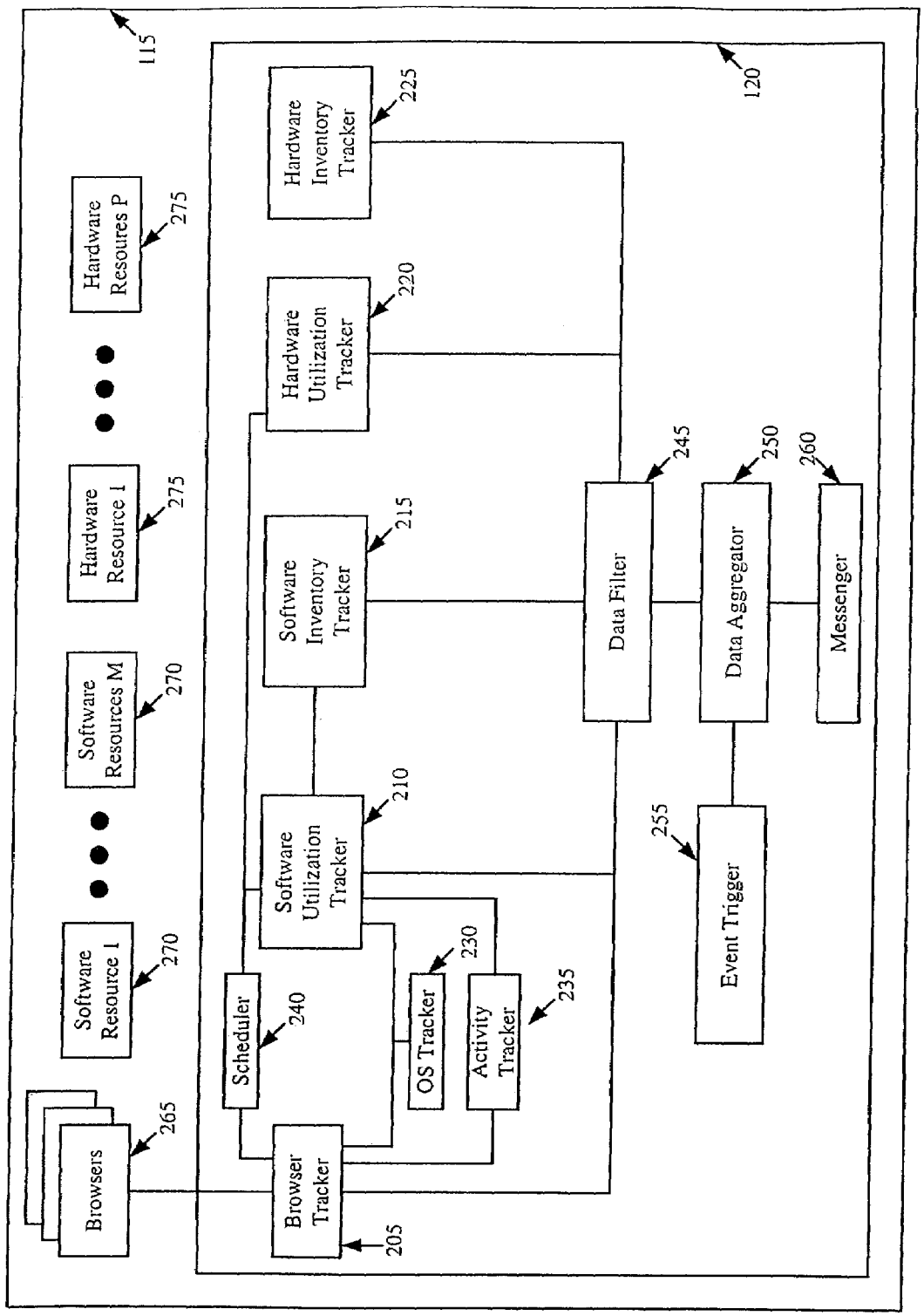
FIG. 2 illustrates the software architecture of a client application of some embodiment of the invention.

FIG. 2 illustrates the software architecture of the client application 120 of some embodiment of the invention. As shown in this figure, the client application 120 includes a browser tracker 205, a software utilization tracker 210, a software inventory tracker 215, a hardware utilization tracker 220, a hardware inventory tracker 225, an operating system ("OS") tracker 230, an activity tracker 235, a scheduler 240, a data filter 245, a data aggregator 250, an event trigger 255, and a messenger 260.

As further shown in this figure, the client computer 115 typically includes one or more browsers 265, several software resources 270, and several hardware resources 275. Not illustrated in FIG. 2 is the operating system that controls the usage of the hardware resources and serves as the foundation of the software applications of the client computer 115. Different embodiments of the invention use different operating systems for the client computer. The embodiments described below use one of the Windows® operating systems offered by Microsoft Corporation.

The client application's software and hardware inventory trackers 215 and 225 respectively inventory the various software and hardware resources 270 and 275 of the client computer 115. The software resources inventoried by the software inventory tracker 215 include application and non-application files that are stored in the client computer's storage (e.g., its hard drive or removable storage). Examples of such files are .exe, .sys, .com, .bat, .dll, .doc, .xsl files.

The hardware resources inventoried by the hardware inventory tracker 225 can include any hardware or hardware setting of the client computer 115. Examples of these resources are memory, disk storage, CPU(s), network card(s), sound card, video card, virtual memory settings, etc.

The client application's browser tracker 205 monitors the use of the client computer's browsers. The browser tracker tracks different browser events in different embodiments. In the embodiments described below, the browser tracker tracks one or more time periods for each URL event of the browsers. Different embodiments define a URL event differently. In the embodiments described below, a URL event is detected upon a successful download of the content that resides at a particular URL. In other embodiments, a URL event occurs when a browser requests certain content that resides at a particular URL. The content residing at a particular URL will be referred to below as the particular URL's content.

In the embodiments described below, the time periods that the browser tracker maintains for each URL event are run time, focus time, and active time. A URL event's run time represents the duration of time that a browser presents the URL's content at the client computer (e.g., displays in a window or frame). Focus time represents the duration of time that the browser's presentation of a URL's content is in focus. Different embodiment can have different definitions for an application that is in focus. In the embodiments described below, an application is in focus when it is an application that takes input from the keyboard and the mouse button. Active time represents the duration of time that a user at the client computer is actively engaged with the browser's presentation of a URL's content.

The software utilization tracker 210 monitors the use of the client computer's software resources 270. This tracker tracks different usage metrics in different embodiments of the invention. In some embodiment, this tracker records three time periods each time a software application is opened on the client computer. These three time periods are: (1) run time, which represents the duration of time that the application is open, (2) focus time, which represents the duration of time that the application is in focus, and (3) active time, which represents the duration of time that the user is actively engaged with the application.

The client application's hardware utilization tracker 220 monitors the use of certain hardware resources 275 of the client computer 115. In some embodiments, this tracker records certain performance characteristics of certain hardware resources over time. For instance, in some embodiments, this tracker records the utilization of the computer's CPU(s), memory, disk storage, and network adapter(s) over time.

The hardware utilization tracker 220, the browser tracker 205, and the software utilization tracker 210 interact with the scheduler 240 in order to synchronize their data collection with the universal clock of the computer system 100 of FIG. 1. Specifically, each of these trackers includes a local cache in which it stores data that it sporadically receives and/or generates. The data in each tracker's local cache is periodically stored to the storage of the client computer. This allows the data to be recovered by the server, in the event of an unexpected shutdown (e.g., a crash) of the client computer or in the event that the client application does not get a chance to send all its data to the server before it has to logoff. In such events, the server can receive the data the next time that the client application starts on the client computer.

Based on a notification from the scheduler, each tracker reads out the content of its local cache and generates data items relating to data that it generated and/or collected during a particular time interval. In some embodiments, the server configures each of the three trackers 205, 210, and 220 to ask the scheduler to send it notifications according to a particular schedule for the tracker. The scheduler maintains a time that is synchronized with the clock of the server 105, and this in turn allows the scheduler to send its notifications according to the server clock. These notifications, in turn, allow the three trackers 205, 210, and 220 to gather their data according to the system clock.

In the embodiment illustrated in FIG. 2, the software and hardware inventory trackers 215 and 225 do not use the scheduler to schedule their inventory operations. This is because the design of the client application 120 does not require precise temporal data with the inventory data. Therefore, it allows the inventory trackers to control the start of their inventory operations based on timers that they keep internally. One of ordinary skill, however, will understand that other embodiments might require the inventory trackers to gather their inventory data at precise system times identified through the scheduler or some other mechanism. Alternatively, one of ordinary skill will also appreciate that some embodiments might not require software inventory tracker 205, software utilization tracker 210, and/or hardware utilization tracker 220 to use the scheduler or to operate based on the system clock.

The browser and software utilization trackers 205 and 210 also interact with the OS tracker 230 and the activity tracker 235, as illustrated in FIG. 2. The OS tracker 230 periodically provides the browser and software utilization trackers with the identity of (1) the software application that is currently in focus, and (2) the list of the applications that are currently open. In some embodiments that are implemented in the MS Windows® environment, the OS tracker identifies the focused application and obtains the current process list from the OS by using commonly used processes that are generally referred to as Enum Procs for the different Windows OS's.

The activity tracker 235 provides the browser and software utilization trackers with an activity variable that specifies whether the application that is in focus is active or not (i.e., whether the computer user is actively engaging the application that is currently in focus). In some embodiments, the activity tracker determines whether the focused application is active based on keyboard and mouse events. For instance, in some embodiments, the activity tracker uses a timer to check periodically for the keyboard and mouse events. Specifically, each time the timer expires, the activity tracker in these embodiments uses GetASynchKeyState and GetCursorPos API's to obtain the content of the keyboard and mouse buffers. When the retrieved content of either of these buffers has changed from the last time that the activity tracker retrieved their contents, the activity tracker sets its activity variable to active if this variable was previously inactive. On the other hand, when the content of neither buffer has changed from the last time that the activity tracker checked these buffers, the activity tracker sets the activity variable to inactive if this variable was previously active. After retrieving the contents of the keyboard and mouse buffers and possibly changing the state of the activity variable, the activity tracker resets its timer and waits for the next time that it has to examine these buffers.

The data filter 245 receives the data items generated by the browser, software, and hardware trackers 205–225. This filter discards some of the collected data that is not particularly relevant for the resource manager. In some embodiments, the server 105 performs additional filtering operations. Accordingly, in these embodiments, the filtering operation of the data filter 245 is meant only as a first order filtering operation that discards only some of the irrelevant data.

The data filter 245 stores the filtered data (i.e., the data that remains after the filtering) in the data aggregator 250. The event trigger 255 checks the data items stored in the data aggregator 250, in order to determine whether a triggering event has occurred for transmitting some or all of the data items in the aggregator to the server 105. In some embodiments, the triggering events can relate to the amount of data stored in the aggregator, the number of data items stored in the aggregator, the attributes of one or more data items, etc. Also, in some embodiments, one or more of the triggering events might not be related to the data items. For instance, in some embodiments, a trigger event might be a timer event that periodically occurs every fixed time interval (e.g., every 30 minutes).

To simplify the illustration of the client application's architecture, FIG. 2 illustrates one data aggregator 250 and one event trigger 255 for the browser, software, and hardware trackers 205–225. However, some embodiments specify one data aggregator and one event trigger for each of these trackers.

Whenever the event trigger detects the occurrence of an event for transmitting some or all of the data items in the aggregator, the event trigger notifies the aggregator to pass the data items to the messenger 260 for transmission to the server 105 through the network 110. The messenger 260 is a typical transport module for a client/server environment. It is a bi-directional transport module that receives and transmits data to the server 105. In some embodiments, this messenger employs a fail-safe mechanism that caches the data items when the messenger does not detect a network connection or when the messenger fails to transmit successfully the data to the server (e.g., when the messenger does not receive a confirmation from the server that it has received the data items, in the embodiments where the server is required to send an acknowledgment reply). This messenger also employs a back-off algorithm that does not immediately try to resend data to the server after a transmission failure.

The messenger transmits each data packet with a session identifier ("session ID"). The session ID is a unique identifier that the server 105 assigns to the client application each time the application starts. Each session ID uniquely identifies each execution of the client application. Each session ID includes the ID of the user that is logged on to the client computer during the session. It also includes the ID of the computer that is used during that session. In some embodiments, the data items that are transmitted between the client application and the server are embedded in XML documents.

FIG. 2 illustrates the client application architecture for only some embodiments of the invention. One of ordinary skill will realize that other embodiments might employ other architectures and/or other modules. For instance, some embodiments might include modules to track the usage of specific software resources.

B. Software Inventory Tracker

The software inventory tracker 215 inventories the software files of the client computer 115. The inventoried software resources include application and non-application files, such as .exe files, .sys files, .com files, .bat files, .dll files, .doc files, .xsl files, etc. In some embodiments, the software inventory tracker 215 periodically scans the client computer's disk storage to inventory the software files that it needs to examine. This tracker maintains a cache that identifies all the inventoried software files.

Each time that this tracker identifies a software file that has been added, removed, or modified, it generates a data item that identifies the added, removed, or modified data file. The tracker passes such data items to the data filter, which then filters them and passes the filtered data to the aggregator for eventual transmission to the system server 105. At the system server, the inventoried data can be analyzed for a variety of purposes. For instance, the data can be analyzed in order to identity the software resources employed on different client computers 115, to categorize these software resources, to detect unauthorized additions, removals, and/or modifications of software files, to detect unlicensed software, etc. The inventoried data is also used to facilitate the software utilization analysis that is performed based on the data collected by the software utilization tracker 210.

Figure 3:
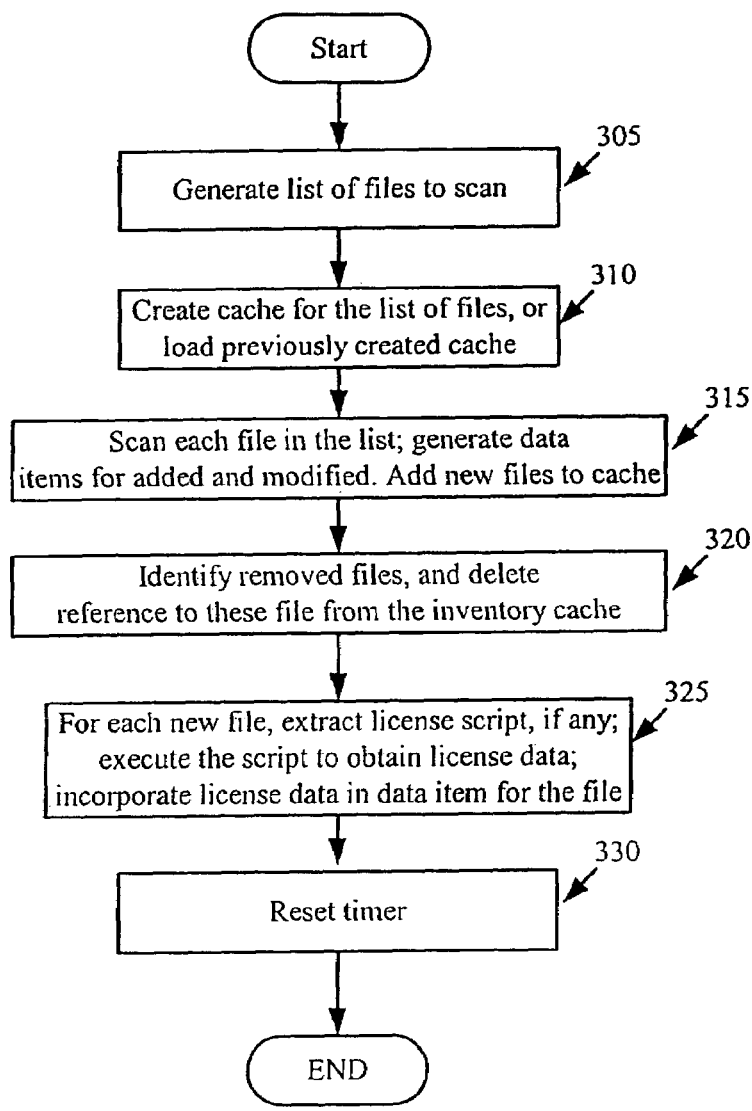
FIG. 3 illustrates several operations that a software inventory tracker of some embodiments performs.

FIG. 3 illustrates several operations that the software inventory tracker 215 performs periodically to create and maintain its cache of inventoried files and to identify added, removed, and modified files. The tracker 215 starts these operations at the expiration of a timer that it maintains. As shown in FIG. 3, the tracker 215 initially identifies (at 305) the list of files that it needs to scan. In some embodiments, the tracker 215 identifies at 305 only some of the files that it needs to inventory periodically. This is because instead of scanning the entire storage of the client computer in a single repetitive inventory operation, the tracker 215 in some embodiments divides its inventory operation into several sub operations, with each sub operations inventorying a different set of files. This reduces the duration of each inventory operation and thereby makes the inventory process less noticeable to the user.

Next, at 310, the tracker 215 (1) creates an inventory cache when this is the first time that it is performing the operations of FIG. 3 for the current session, or (2) loads the previously created inventory cache when this iteration is not the first iteration of the operations of FIG. 3. As mentioned above, the inventory cache identifies all the inventoried software files.

Figure 4:
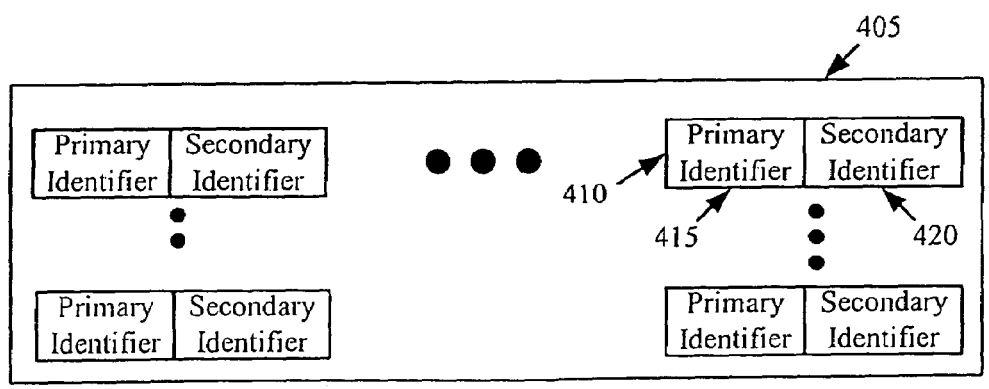
FIG. 4 illustrates one example of a cache used by the software inventory tracker.

FIG. 4 illustrates one example of such a cache. As shown in this figure, the cache 405 includes one entry 410 for each software file that the tracker 215 inventories. Each inventory entry 410 includes a primary identifier 415 and a secondary identifier 420. In the embodiments described below, the primary identifier is a software inventory identification ("SIID"), which is a unique identification of a file that is produced based on the content of the file. Some embodiments generate the SIID for a file by hashing some or all of the file's content (e.g., hashing the first 10 MB of the file). Some of these embodiments use standard hashing techniques, such as a standard 128 bit hashing technique. The secondary identifier is based on computer system attributes of the file. These attributes are referred to below as secondary-identifier attributes. For instance, in the embodiments described below, the secondary identifier attributes includes the name, the storage location (e.g., the file path), modified date, and size of the file. The secondary identifier attributes can include other attributes, such as manufacturer (if applicable).

As further described below, the tracker 215 uses two identifiers for each inventoried file so that it can identify previously inventoried files that have had only their content modified or their system attributes modified. It should be noted that a change to a file's content would change its SIID. Also, the tracker 215 treats a file as one that has not previously been inventoried when the file's content, name, and storage location are all modified after the file is inventoried.

After creating or loading the cache at 310, the tracker 215 scans (at 315) each file in the list generated at 305. For each scanned file, the tracker 215 performs (at 315) several operations illustrated in FIG. 5. These operations (1) generate an SIID for the file, and (2) possibly generate a data item for the file if it has not yet been inventoried or if it has been modified after the last time that it was inventoried.

Figure 5:
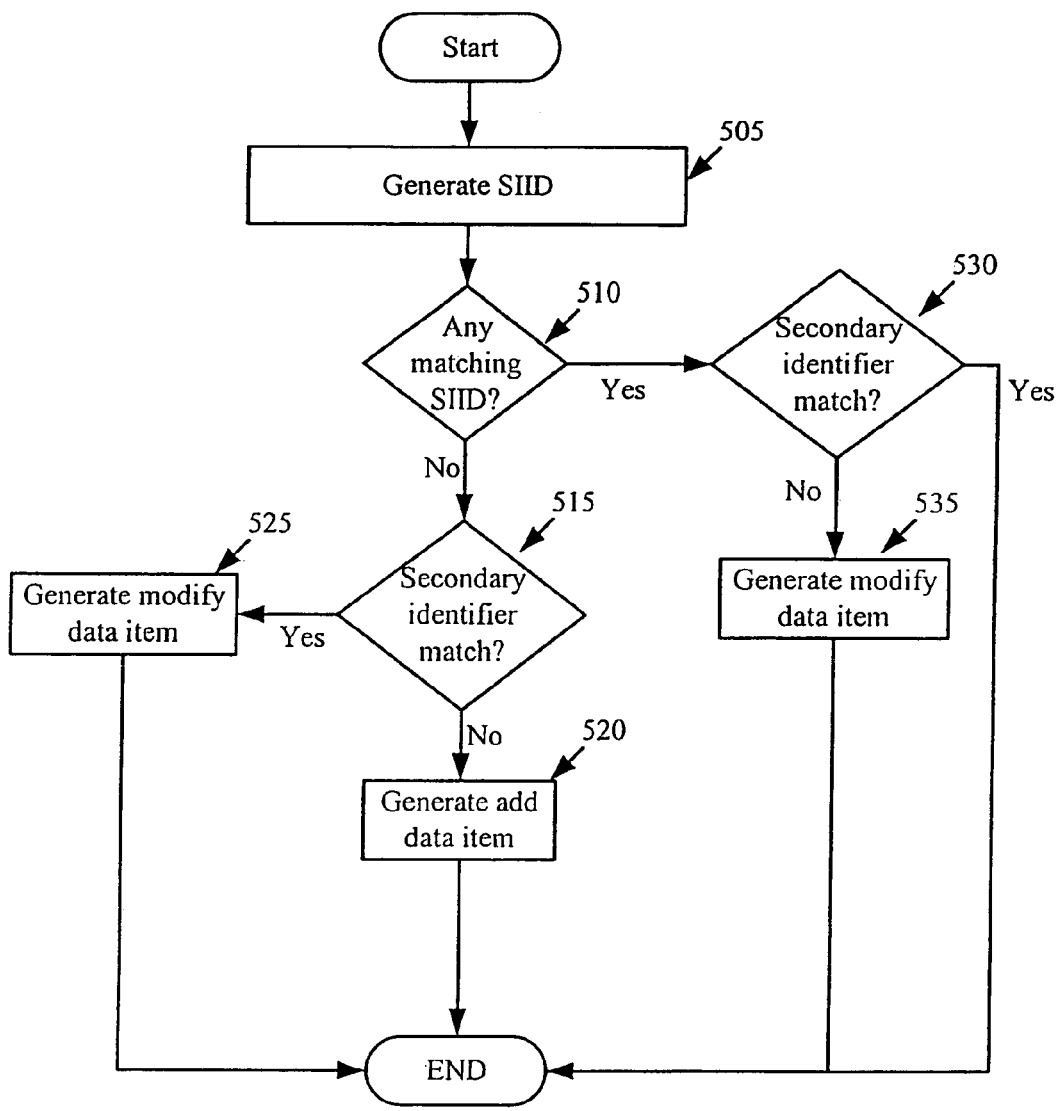
FIG. 5 illustrates several operations that the software inventory tracker performs.

Specifically, as shown in FIG. 5, the tracker 215 generates (at 505) an SIID for the file. It then determines (at 510) whether the inventory cache includes an entry with an SIID that matches the SIID of the file. If not, the tracker 215 then determines (at 515) whether the inventory cache includes an entry that specifies secondary-identifier attributes that match the file's secondary-identifier attributes. If not, the tracker 215 adds (at 520) a data entry 410 in the inventory cache for the file, where the data entry specifies the file's SIID and secondary-identifier attributes. At 520, the tracker 215 generates a new data item (called an "add data item") that is for directing the server 105 to add the newly inventoried file to the list of files that the server maintains for the client computer. In some embodiments, this generated data item specifies the SIID, name, path, application name (if applicable), version (if applicable), size, modification date (if applicable), manufacturer (if applicable). If applicable, this data item also specifies license information such as number, type, registered user, description, and expiration date.

If the tracker 215 identifies (at 515) a cache entry that specifies secondary-identifier attributes that match the secondary-identifier attributes of the file, the tracker 215 identifies the file as one that was previously inventoried but has its content changed since the last time that it was inventoried. Hence, at 525, it changes the SIID of the cache entry identified at 515 to the SIID generated at 505. It also generates a data item (called a "modify data item") that specifies the new SIID for the file. In some embodiments, the modify data item provides the old and new SIID's for the modified file, as well as any other attribute of the file that has changed since it was last inventoried.

If the tracker 215 identifies (at 510) a cache entry with an SIID that matches the SIID generated at 505 for the file, the tracker determines (at 530) whether the entry with the matching SIID specifies secondary-identifier attributes that match the secondary-identifier attributes of the file. If so, the tracker 215 ends the operations of FIG. 5 without generating any data item, as it has identified a data entry with an SIID, file name, and storage location that match the SIID, file name, and storage location of the file. Such identification means that the tracker has previously inventoried the scanned file and that this file's content, name, and storage location have not been modified since it was last inventoried.

On the other hand, in some cases, the tracker 215 determines (at 530) that the entry with the matching SIID does not specify secondary-identifier attributes that match the secondary-identifier attributes of the file. This occurs when the file's secondary-identifier attributes are modified after it has been inventoried but its content remains the same. For these situations, the tracker 215 makes (at 535) the secondary-identifier attributes specified by the cache entry identified at 510 identical to the secondary-identifier attributes of the file. It also generates (at 535) a modify data item that specifies the modification to the secondary-identifier attributes of the file. In some embodiments, the modify data item provides the old and new file secondary-identifier attributes that have changed since the file was last inventoried.

After 315, the tracker 215 identifies (at 320) the files that have been removed since the last time it inventoried the group of files identified at 305. The tracker identifies the removed files by scanning the inventory cache and identifying any data entry (1) which relates to the list of filed generated at 305 and (2) which was not identified (at 315) as a data entry with a primary identifier or a secondary identifier that matched the primary or secondary identifier of a file on the list. For each data entry that the tracker 215 identifies at 320, it generates a data item that specifies that the file associated with the entry's SIID has been removed, and then removes the entry from the inventory cache.

Next, the tracker determines (at 325) whether any file that it identified at 315 as a newly added file (as the file did not have primary and secondary identifiers that matched the primary and secondary identifiers of any cache data entry) has a license script associated with it. If so, the tracker 215 uses a script manager to extract the license data for each newly added file that has an associated license script, and then adds the license data to the data item that the process generated for the file. After 325, the tracker resets (at 330) its internal timer that notifies it of when to repeat the operations illustrated in FIG. 3. After 330, the operations illustrated in FIG. 3 terminate. The tracker 215 eventually sends all the data items that it generated at 315 and 320 to the data filter.

The software inventory tracker 215 also works in conjunction with the software utilization tracker 210. Specifically, each time the utilization tracker 210 encounters a new running process, it provides the inventory tracker with the secondary-identifier attributes of the file associated with the newly encountered process, and asks the inventory tracker 215 for the SIID of this file. The inventory tracker then performs the operations illustrated in FIG. 5 for this file. Specifically, the tracker 215 generates (at 505) for the file an SIID, which it then supplies to the utilization tracker. It also (1) at 520, adds a new data entry in the inventory cache and generates an add data item when it identifies the file as one that has not been previously inventoried, or (2) at 525 or 530, modifies a data entry in the inventory cache and generates a modify data item when it identifies the file as one that has been modified since the last time that it was inventoried. The execution of the operations of FIG. 5 in response to an SIID-request by the software utilization tracker provides the software inventory tracker with a capability to perform on-demand inventory management.

C. Software Utilization Tracker

The software utilization tracker 210 monitors the use of the client computer's software resources 270. In the embodiments described below, this tracker monitors the use of .exe application files. One of ordinary skill will realize that other embodiments can also monitor the use of other software files, such as .dll files, .doc files, .xsl files, etc.

FIG. 6 presents a conceptual illustration of the software utilization tracker. As shown in this figure, the software utilization tracker includes a data-gathering engine 605, a cache 610, and a data-exporting engine 615. The data-gathering engine 605 receives the output of the OS tracker 230 and the activity tracker 235. Based on these outputs, the data-gathering engine 605 gathers data each time a software application is opened on the client computer. For each opened application, the gathered data relates to: (1) the application's run time, which is the duration of time that the application is open, (2) the application's focus time, which is the duration of time that the application is in focus, and (3) the application's active time, which is the duration of time that the user is actively engaged with the application. The data-gathering engine stores the gathered data in the cache 610. The data-exporting engine 615 reads out the content of the cache 610 (i.e., generates data items) each time it receives a notification from the scheduler 240. The data-gathering engine is first described below by reference to FIG. 7. The data-exporting engine 615 is then described by reference to FIGS. 8–11.

Each time an application is opened, the OS defines a new process and a new OS process ID that specifies this new process. At any given time, the OS maintains a list of all currently active processes. In other words, this list (called a "process list") enumerates the process ID's of all processes running at a given time. The OS tracker periodically obtains from the OS this process list. When the client application 120 starts (e.g., at boot up), the data-gathering engine registers to periodically receive the list of applications that are open (i.e., the process list) from the OS tracker.

Figure 7:
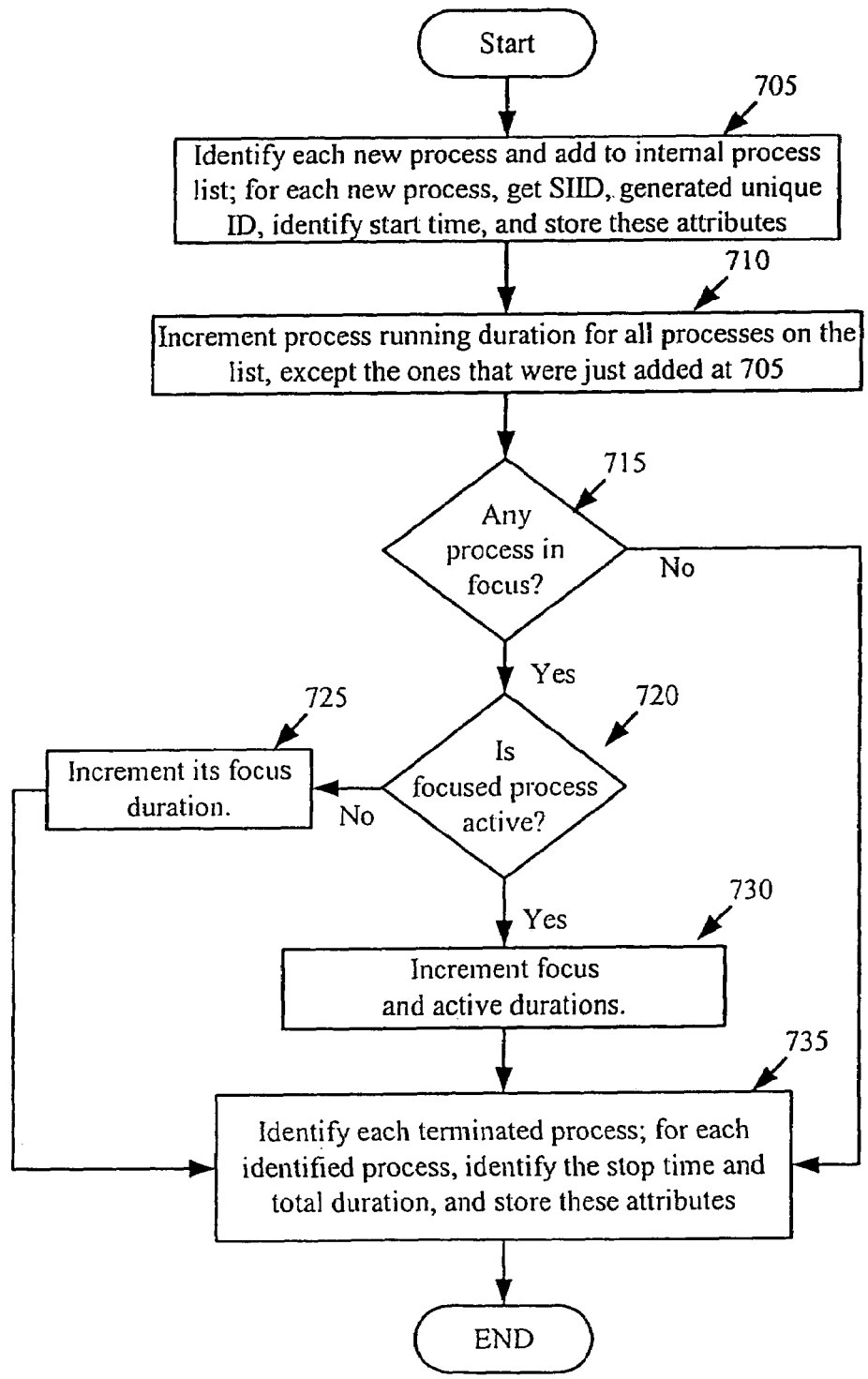
FIG. 7 illustrates several operations that a data-gathering engine of the software utilization tracker performs.

Each time that the data-gathering engine 605 receives a process list from the OS tracker 230, the data-gathering engine performs several operations illustrated in FIG. 7. As shown in this figure, the engine 605 starts by updating (at 705) an internal process list that it maintains. This internal process list enumerates the OS process ID's of all processes for which the cache 610 currently stores values.

To update the internal process at 705, the engine 605 determines (at 705) whether each particular process ID on the received process list is on its internal process list. Whenever a particular process ID on the received list is not on its internal list, the engine 605 adds (at 705) the particular process ID to the internal list. Also, each time the engine 605 adds (at 705) a particular process ID to its internal list, the engine performs the following six operations. First, it identifies the secondary-identifier attributes of the application associated with the added process ID, and asks the inventory tracker 215 for the SIID of the associated application. Second, it generates a unique ID that in conjunction with the session ID uniquely identifies this execution of the application. Third, it specifies the current time as the start time for this execution of the application. Fourth, it instantiates a data object in the cache for storing several attributes relating to this execution of the application. Fifth, it stores the received OS process ID, the generated SIID, the identified unique ID, and the start time for this execution of the application in the instantiated data object. Sixth, it initializes several other attributes of the instantiated data object. These attributes include (1) an end time for specifying the time when this execution of the application terminates, (2) an incremental process duration for specifying an incremental duration of this execution, (3) a focus duration for specifying the time that this execution was in focus, (4) an active time for specifying the time that this execution was actively engaged by the user. These six operations do not have to be performed in sequence.

After 705, the data-gathering engine 605 increments (at 710) the incremental process duration of each process on the data-gathering engine's process list except the processes that were just added at 705. The engine increments each process duration by the amount of time since the last instance when the OS tracker provided its list of running applications to the data-gathering engine.

Next, the engine determines (at 715) whether a process is currently in focus. Each time the focus changes from one process to another, the OS tracker notifies the engine 605 of the identity of the new process that is in focus. This engine then increments the focus-duration attribute of the previously focused process' data object in the cache 610, and sets an internal variable that identifies the newly focused process. Different embodiments increment the focus-duration attribute of the previously focused process differently. Some embodiments increment this attribute by a fixed time interval. Others increment this attribute by the amount of time that has elapsed since the last time that this attribute was incremented. For the later approach, the data-gathering engine 605 needs to maintain a timer to measure the elapsed time.

At 715, the data-gathering engine examines the value of its internal variable to determine whether a process is currently in focus, and if so, the identity of the focused process. If this engine determines (at 715) that no process is in focus, it transitions to 735, which is further described below.

On the other hand, if a process is in focus, the data-gathering engine determines (at 720) whether the focused process is also active. This engine makes this determination based on the activity variable that it receives from the activity tracker 235. The activity tracker periodically supplies an activity variable that specifies whether the user is currently engaging a focused application.

When the activity variable specifies an active status, the data-gathering engine transitions from 720 to 730. At 730, this engine increments the focus-duration and active-duration attributes of the focused process' data object in the cache 610. In some embodiments, the engine 605 increments these attributes by a time interval between receiving the current process list and the previous process list. When the activity variable specifies an inactive status, the data-gathering engine transitions from 720 to 725. At 725, this engine increments just the focus-duration attribute of the focused process' data object in the cache 610. Again, in some embodiments, the engine increments the focus-duration attribute by the time interval between receiving the current process list and the previous process list.

From 725 or 730, the data-gathering engine transitions to 735. At 735, this engine identifies any process specified on its internal process list that is not specified on the received process list (i.e., identifies any process that is no longer running). For each process that this engine identifies at 735, this engine (1) specifies the current time as the stop time of the process, and (2) sets the process' stop time in the data object for the process in the cache 610. After 735, the flow illustrated in FIG. 7 terminates.

Figure 8:
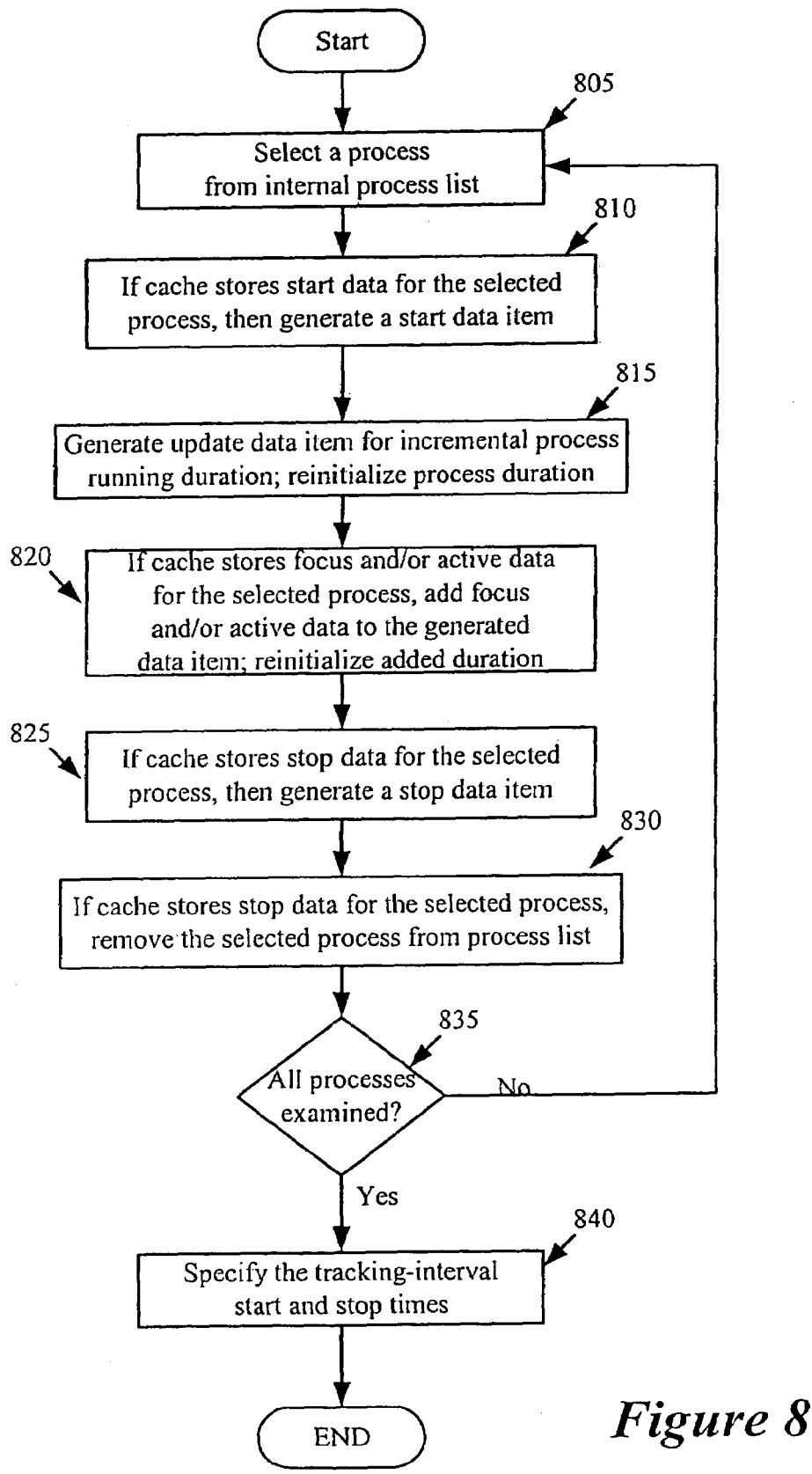
FIG. 8 illustrates several operations that a data-exporting engine of the software utilization tracker performs.

As mentioned above, the data-exporting engine 615 reads out the data that the data-gathering engine 605 stores in the cache 610. The data-exporting engine reads out this data each time it receives a trigger event from the scheduler. FIG. 8 illustrates several operations that the data-exporting engine 615 performs each time it receives a trigger event from the scheduler. As shown in this figure, the data-exporting engine 615 initially selects (at 805) a process from the internal process list that the data-gathering engine 605 periodically updates at 705. The data-exporting engine 615 then examines (at 810) the cache to determine whether it specifies a start time for the selected process. If so, this engine generates (at 810) a start data item for the selected process. FIG. 9 illustrates the attributes of a start data item 900 in some embodiments of the invention. The start data item 900 specifies the start time, the SIID, and the unique ID of the selected process.

After 810, the data-exporting engine 615 generates (at 815) an update data item for the selected process. FIG. 10 illustrates the attributes of an update data item 1000 in some embodiments of the invention. The update data item 1000 specifies the SIID, the unique ID, the incremental process-running duration, the focus duration, and the active duration of the selected process. At 815, the data-exporting engine 615 sets the SIID, unique ID, and incremental process-running duration of the update data item to the corresponding values of these attributes that are stored in the cache 610. At 815, the engine 615 also re-initializes the selected process' process-running duration in the cache.

After 815, the engine 615 examines (at 820) the cache to determine whether it specifies a non-default focus duration and/or active duration for the selected process. If so, the engine adds (at 820) the incremental focus and/or active durations to the update data item generated at 815. At 820, the engine 615 also re-initializes the selected process' focus and active durations.

Next, the data-exporting engine 615 examines (at 825) the cache to determine whether it specifies termination data for the selected process. If so, this engine generates (at 825) a stop data item for the selected process. FIG. 11 illustrates the attributes of a stop data item 1100 in some embodiments of the invention. The stop data item 1100 specifies the SIID, the unique ID, and the stop time of the selected process. When the cache includes termination data for the selected process, the data-exporting engine not only generates the stop data, but also removes (at 825) the selected process' ID from the internal process list.

After 830, the data-exporting engine determines (at 835) whether it has examined all the processes specified on the internal process list. If not, the engine returns to 805 to select another process specified by this list, and then to repeat 810–830 for this newly selected process. When this engine determines (at 835) that it has examined all the processes specified by the internal process list, it specifies (at 840) the start and stop times of the tracking interval. The tracking interval is the interval between the current and last times that the exporting engine 615 performed the operations of FIG. 8 (i.e., between the current and last times that the exporting engine 615 received trigger events from the scheduler). It specifies the tracking-interval start and stop times for all the data items that it generated in the current iteration of operations 805–835. It can specify the start and stop times by incorporating these times in each generated data item, or it can have one copy of the start and stop times for all the data items stored in the aggregator. After 840, the engine 615 terminates the flow illustrated in FIG. 8.

D. Browser Tracker

The browser tracker 205 monitors the use of the client computer's browsers. The browser tracker tracks different browser events in different embodiments. In the embodiments described below, the browser tracker tracks one or more time periods for each URL event of the browsers. In the embodiments described below, a URL event occurs when the client computer downloads the content that resides at a particular URL. The content residing at a particular URL will be referred to below as the particular URL's content.

Figures 12, 15, 16, 17:
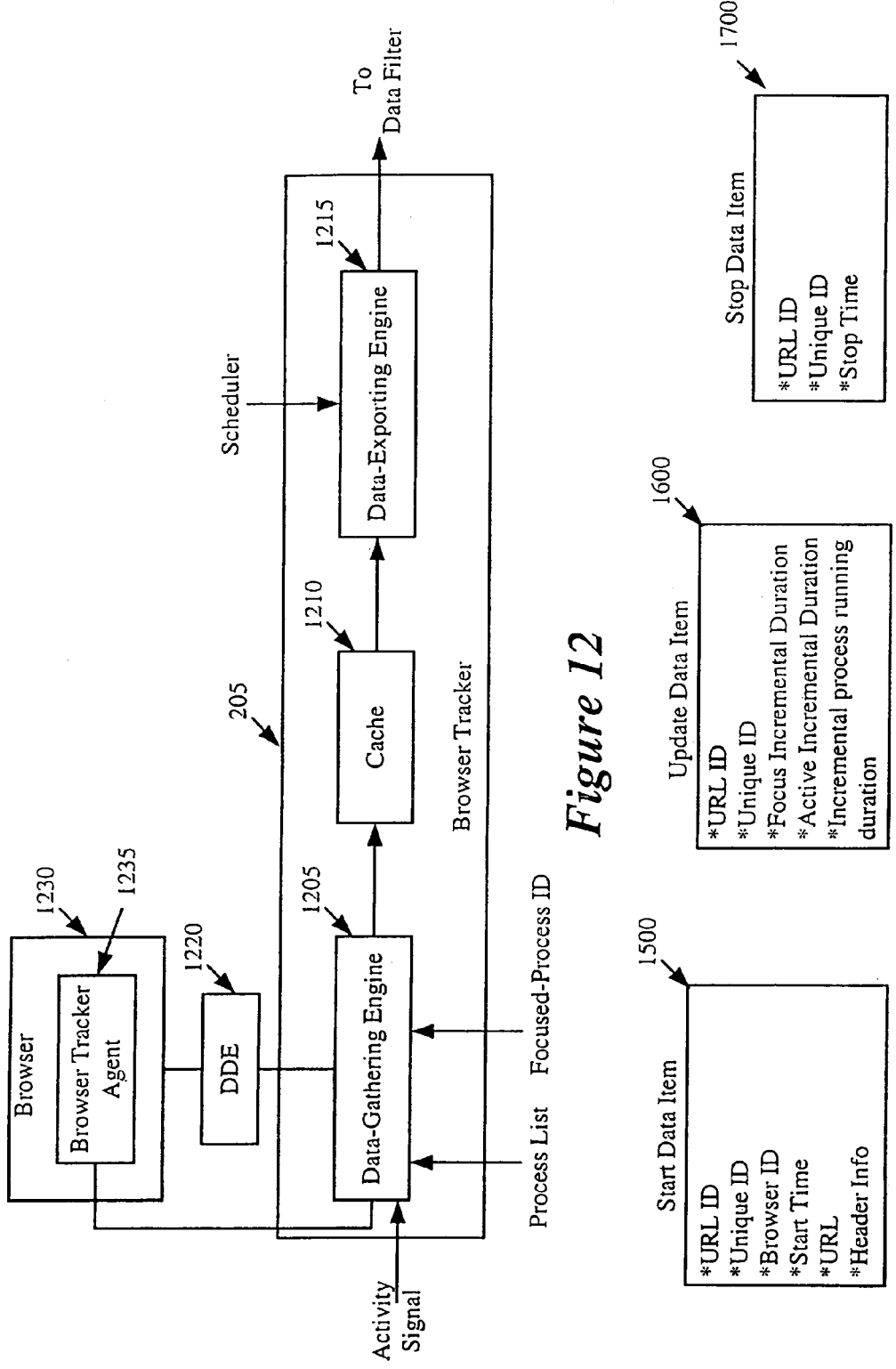
FIG. 12 presents a conceptual illustration of a browser tracker.
FIGS. 15–17 illustrate the attributes of start, update, and stop browser data item in some embodiments of the invention.

FIG. 12 presents a conceptual illustration of the browser tracker. As shown in this figure, the browser tracker includes a data-gathering engine 1205, a cache 1210, and a data-exporting engine 1215. The data-gathering engine 605 receives data from the OS tracker 230 and the activity tracker 235. Specifically, when the client application 120 starts (e.g., at boot up), the data-gathering engine registers to receive periodically the process list and focused-process ID from the OS tracker, and registers to received the activity signal from the activity tracker.

This engine also receives URL echo events through one of two mechanisms illustrated in FIG. 12. In some embodiments, the data-gathering engine 1205 receives URL echo events through a browser tracker agent 1235 that is loaded with the browser 1230. In some of these embodiments, the browser tracker agent 1235 is used in conjunction with the Internet Explorer ("IE") browser. In these embodiments, this agent is a .dll that is loaded when the IE browser is loaded. When loaded, this agent 1235 registers as a client for receiving IE events from the IE browser. Each time IE downloads certain content that resides at a particular URL, it publishes an IE event to all registered recipients of IE events. A published IE event specifies the downloaded URL, some HTTP header info as well as some frame information. Whenever the browser tracker agent 1235 receives an IE event, it forwards it to the data-gathering engine 1205 of the browser tracker 205.

In other embodiments, the data-gathering engine 1205 receives these events through the dynamic data exchange ("DDE") 1220 of the OS. Specifically, the browser 1230 registers with the OS as a DDE server when the browser loads. Each time the browser tracker's data-gathering engine 1205 identifies (on the process list received from the OS tracker) a new instance of a browser that is running, this engine registers with the OS as a DDE client that should receive browser events relating to the newly identified browser instance. From thereon, whenever the browser downloads certain content that resides at a particular URL through the newly identified browser instance, the browser publishes its URL event to each module (including engine 1205) that registered as a DDE client for the newly identified browser instance. Each URL event that is published in this manner provides the URL plus some ancillary frame information. In some embodiments, the data-gathering engine 1205 uses the DDE-mechanism for non-IE browsers, such as the Netscape navigator.

Based on the data that it receives, the data-gathering engine 1205 stores data in the cache 1210 each time it receives a URL event. For each URL event, the gathered data relates to: (1) the URL's incremental run time, which represents an incremental duration of time that the browser presents the URL's content at the client computer (e.g., displays in a window or frame), (2) the URL's focus time, which represents the duration of time that the browser's presentation of a URL's content is in focus, and (3) the URL's active time, which is the duration of time that a user at the client computer is actively engaged with the browser's presentation of a URL's content.

The data-exporting engine 1215 reads out the content of the cache 1210 (i.e., generates data items) each time it receives a notification from the scheduler 240. The data-gathering engine is first described below by reference to FIG. 13. The data-exporting engine 1215 is then described by reference to FIGS. 14–17.

Figure 13:
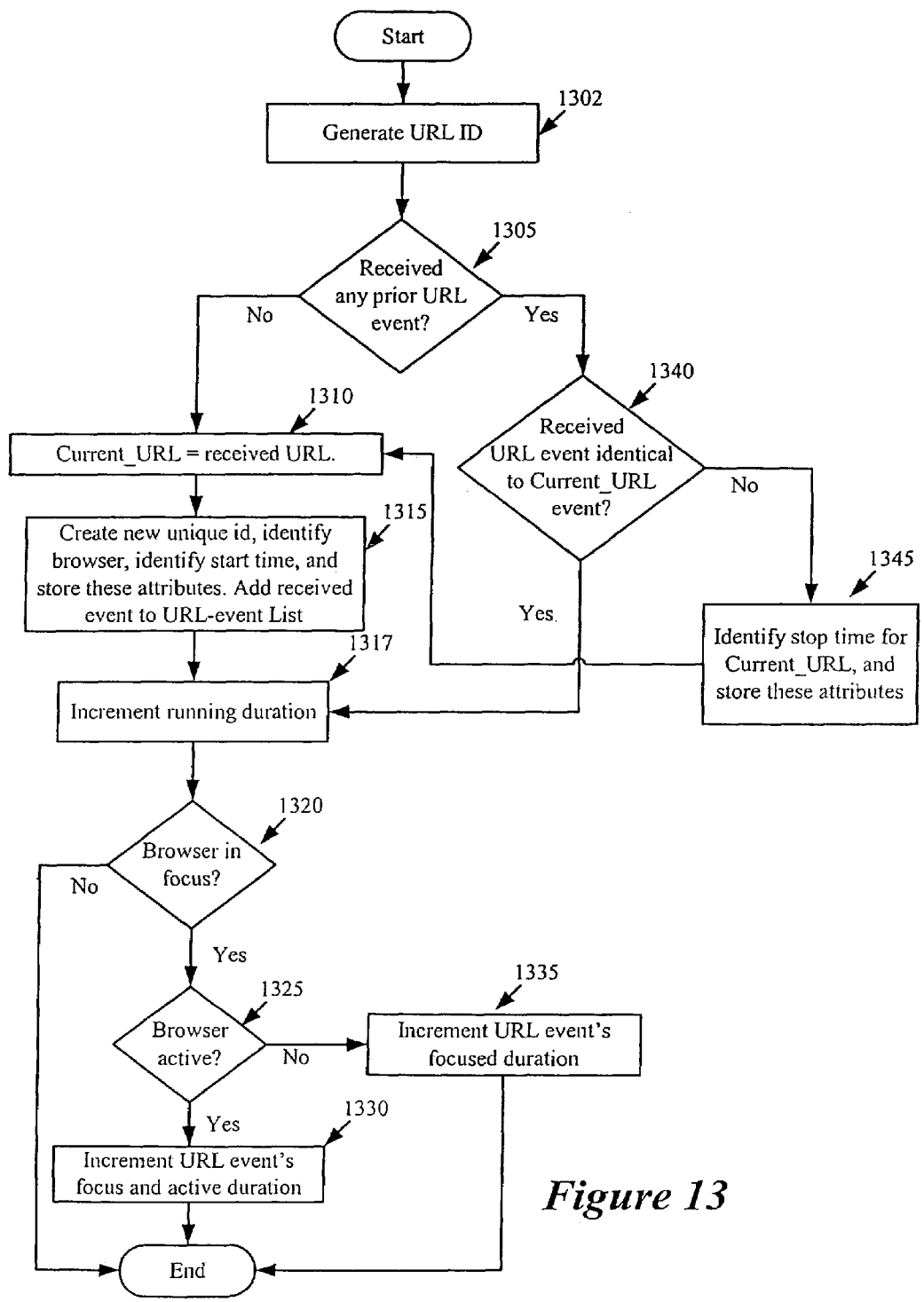
FIG. 13 illustrates several operations that a data-gathering engine of the browser tracker performs.

Each time that the data-gathering engine 1205 receives a URL event for a particular instance of a running browser, the data-gathering engine performs several operations illustrated in FIG. 13. As shown in this figure, the engine 1205 initially generates (at 1302) a URL ID. In some embodiments, the generated URL ID is an MD5 hash of the domain and path data of the URL. Next, the engine 1205 determines (at 1305) whether it had previously received another URL event for the particular browser instance at issue (i.e., the browser instance of the received URL event). If not (i.e., if the received URL is the first URL event that the engine has received in the current session for the particular browser instance at issue), the engine sets (at 1310) a variable Current_URL to the URL of the received event. This variable identifies the current URL of the particular browser instance at issue.

The engine 1205 then specifies (at 1315) a unique ID for the received URL event, and adds this unique ID and the generated URL Id to a URL event list that the engine maintains. The unique ID in conjunction with the session ID uniquely identifies the received URL event. At 1315, the engine also specifies the current time as the start time for the received URL. Also, it records the browser for the received URL event.

At 1315, the engine then (1) instantiates a data object in the cache 1235 for the received URL event, and (2) stores the URL, URL ID, unique ID, start time, and browser of the received URL event in this instantiated data object. In the embodiments that use the browser tracker agent 1235, the engine also stores (at 1315) in the cache data object the header information that it receives as part of the URL event supplied by the agent 1235. Also, at 1315, the engine initializes several other attributes of the instantiated data object. These attributes include (1) an end time for specifying the time when the URL event terminates, (2) a incremental run duration for specifying an incremental duration of time that the browser presents the URL's content at the client computer, (3) a focus duration for specifying the time that the URL event is in focus, and (4) an active time for specifying the time that the URL event is actively engaged by the user.

After 1315, the data-gathering engine 1205 increments (at 1317) the incremental run duration of the received URL event. The engine increments this duration by the amount of time since the last instance when this engine received a URL event for the particular browser instance at issue. After 1317, the engine determines (at 1320) whether the particular browser instance at issue is currently in focus. Each time the focus changes from one process to another, the OS tracker notifies the engine 1205 of the identity of the new process that is in focus. If the previously focused process is the particular browser instance at issue, this engine then increments the focus-duration attribute of the cache data object of the previously focused URL event for the particular browser instance, and then sets an internal variable that identifies the newly focused process. Different embodiments increment the focus-duration attribute of a previously focused URL event differently. Some embodiments increment this attribute by a fixed time interval. Others increment this attribute by the amount of time that has elapsed since the last time that this attribute was incremented. For the latter approach, the data-gathering engine 1205 needs to maintain a timer to measure the elapsed time.

At 1320, the data-gathering engine examines the value of its internal variable to determine whether a process is currently in focus, and if so, the identity of the focused process. If this engine determines (at 1320) that the particular browser instance at issue is not in focus, it ends the operations illustrated in FIG. 13. On the other hand, if the particular browser instance at issue is in focus, the data-gathering engine determines (at 1325) whether the focused browser instance at issue is also active. This engine makes this determination based on the activity variable that it receives from the activity tracker 235. The activity tracker periodically supplies an activity variable that specifies whether the user is currently engaging a focused application.

When the activity variable specifies an active status, the data-gathering engine transitions from 1325 to 1330. At 1330, this engine increments the focus-duration and active-duration attributes of the cache data object for the active, focused URL event. In some embodiments, the engine 1205 increments these attributes by a time duration that corresponds to the time interval between receiving the current and previous events for the particular browser instance at issue. When the activity variable specifies an inactive status, the data-gathering engine transitions from 1325 to 1335. At 1325, this engine increments just the focus-duration attribute of the cache data object of the focused URL event. Again, in some embodiments, the engine increments the focus-duration attribute by the time duration that corresponds to the time interval between receiving the current and previous events for the particular browser instance at issue. After 1330 or 1335, the operations illustrated in FIG. 13 terminate.

If the engine determines at 1305 that it has received a prior URL event for the particular browser instance at issue (i.e., if the received URL is not the first URL event that the engine has received in the current session for the particular browser instance at issue), the engine determines (at 1340) whether the URL of the received event is identical to the Current_URL for the particular browser instance at issue. If so, the engine transitions to 1317, which was described above. If not, it transitions to 1345. At 1345, the engine specifies the current time as the stop time of the Current_URL's event, and sets this URL event's stop time in its data object in the cache 1210. From 1345, the engine transitions to 1310, which was described above.

The data-gathering engine 1205 also sets the stop time of the Current_URL of a particular browser instance, when this engine determines that the particular browser instance is no longer running. Specifically, as mentioned above, this engine receives the process list from the OS tracker periodically. Whenever it receives such a list, one of the tasks that it performs is to identify any browser instance that was on the previous process list (i.e., the process list that it received immediately before the current process list) but not the current process list. If it identifies any such recently terminated browser instance, the engine (1) identifies the object in the cache 1210 for storing data relating to this browser instance's Current_URL, and (2) sets the stop time specified by this object to the current time.

Figure 14:
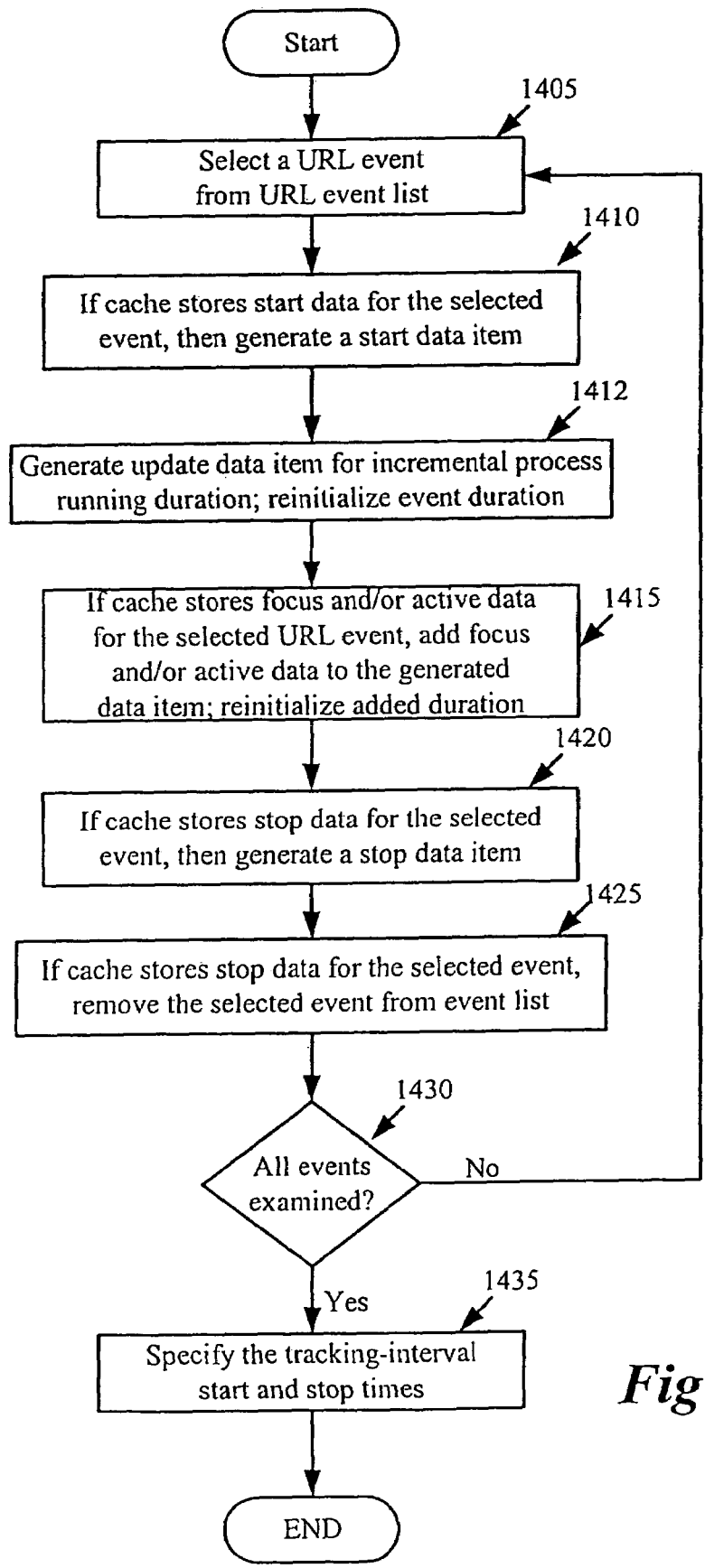
FIG. 14 illustrates several operations that a data-exporting engine of the browser tracker performs.

As mentioned above, the data-exporting engine 1215 reads out the data that the data-gathering engine 1205 stores in the cache 1210. The data-exporting engine reads out this data each time it receives a trigger event from the scheduler. FIG. 14 illustrates several operations that the data-exporting engine 1215 performs each time it receives a notification from the scheduler.

As shown in this figure, the data-exporting engine 1215 initially selects (at 1405) a URL event from the URL-event list that the data-gathering engine 1205 keeps. The data-exporting engine 1215 then examines (at 1410) the cache 1210 to determine whether it specifies a start time for the selected URL event. If so, this engine generates (at 1410) a start data item for the selected URL event. FIG. 15 illustrates the attributes of a start data item 1500 in some embodiments of the invention. The start data item 1500 specifies the URL ID, the browser ID, the start time, the URL, the unique ID, and the header information (if any) of the selected URL event.

After 1410, the data-exporting engine 1215 generates (at 1412) an update data item for the selected URL event. FIG. 16 illustrates the attributes of an update data item 1600 in some embodiments of the invention. The update data item 1600 specifies the URL ID, the unique ID, the focus duration, the active duration, and the incremental running duration of the selected URL event. At 1412, the data-exporting engine 615 sets the unique ID and incremental running duration of the update data item to the corresponding values of these attributes that are stored in the cache 1210. At 1412, the engine 1215 also re-initializes the selected URL's running duration in the cache.

After 1412, the engine 1215 examines (at 1415) the cache to determine whether it specifies a non-default focus duration and/or active duration for the selected URL event. If so, this engine adds (at 1415) the incremental focus and/or active durations to the update data item generated at 1412. At 1415, the engine 1215 also re-initializes the selected URL event's focus and active durations.

Next, the data-exporting engine 1215 examines (at 1420) the cache to determine whether it specifies termination data for the selected URL event. If so, this engine generates (at 1420) a stop data item for the selected URL event. FIG. 17 illustrates the attributes of a stop data item 1700 in some embodiments of the invention. The stop data item 1700 specifies the URL ID, the unique Id and the stop time of the selected URL event. When the cache includes termination data for the selected URL event, the data-exporting engine not only generates the stop data, but also removes (at 1425) the selected URL event' ID from the URL event list.

After 1425, the data-exporting engine determines (at 1430) whether it has examined all URL events specified on the URL-event list. If not, the engine returns to 1405 to select another URL event specified by this list, and then to repeat 1410–1425 for this newly selected URL event. When this engine determines (at 1430) that it has examined all events specified by the URL event list, it specifies (at 1435) the start and stop times of the tracking interval. The tracking interval is the interval between the current and last times that the exporting engine 1215 performed the operations of FIG. 14 (i.e., between the current and last times that the exporting engine 1215 received trigger events from the scheduler). It specifies the tracking-interval start and stop times for all the data items that it generated in the current iteration of operations 1405–1430. It can specify the start and stop times by incorporating these times in each generated data item, or it can have one copy of the start and stop times for all the data items stored in the aggregator. After 1430, the engine 1215 terminates the flow illustrated in FIG. 14.

E. Hardware Inventory Tracker

The hardware inventory tracker 225 inventories the hardware resources of the client computer 115. The hardware resources inventoried by the hardware inventory tracker 220 can include any hardware or hardware setting of the client computer 115. Examples of these resources are memory, disk storage, CPU(s), network card(s), sound card, video card, virtual memory settings, etc.

In some embodiments, the hardware inventory tracker 225 periodically inventories the hardware resources and maintains an inventory cache that identifies all the inventoried resources. Each time that this tracker identifies a hardware resource that has been added or removed, it generates a data item that identifies the added or removed resource. The tracker passes such data items to the data filter, which then filters them and passes the filtered data to the aggregator for eventual transmission to the system server 105.

At the system server, the inventoried data can be analyzed for a variety of purposes. For instance, the data can be analyzed in order to identity the hardware resources employed on different client computers 115, to categorize these hardware resources, to detect unauthorized additions and/or removals of hardware resources, etc. The inventoried data can also be used to facilitate the hardware utilization analysis that is performed based on the data collected by the hardware utilization tracker 210.

Figure 18:
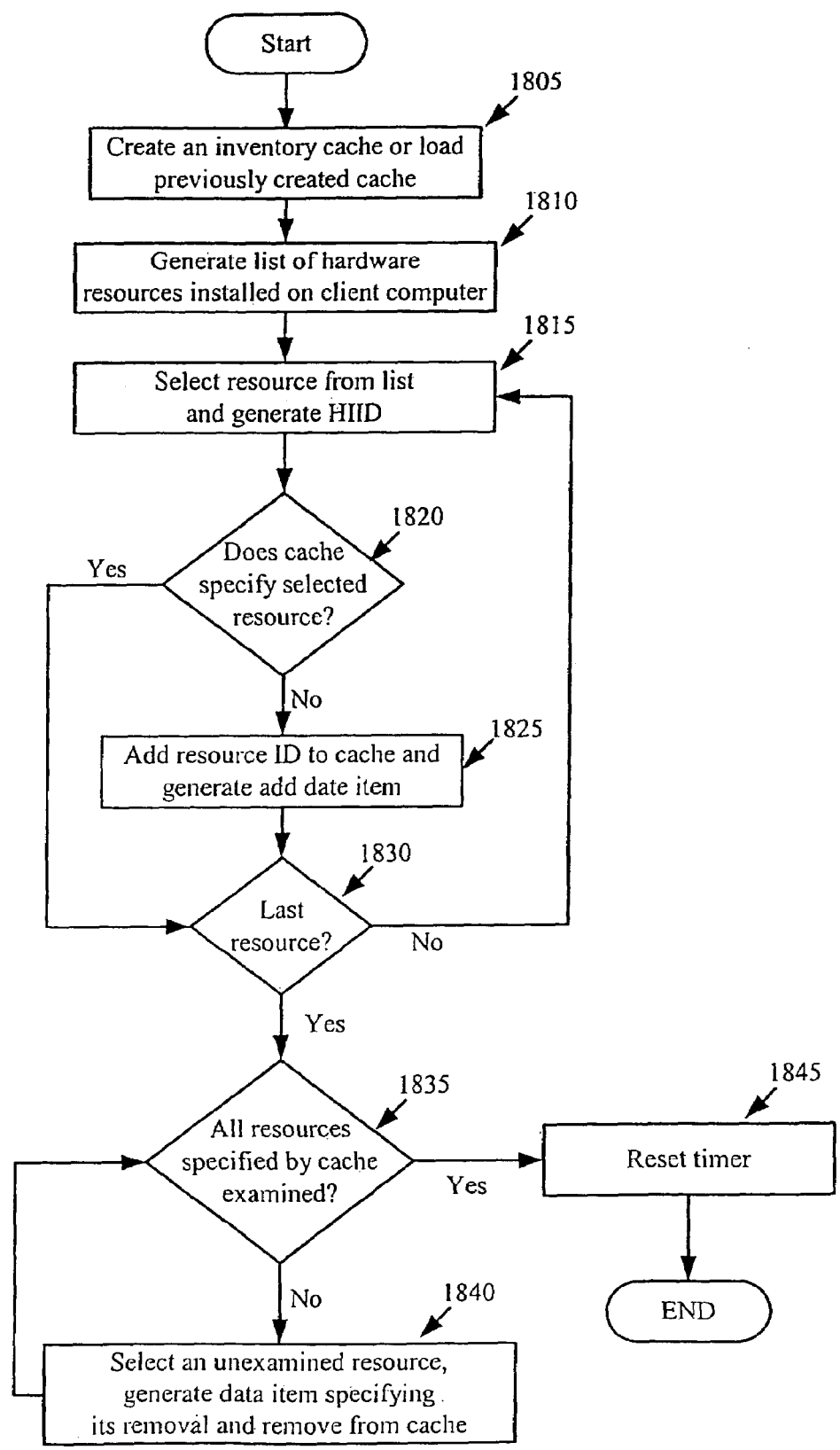
FIG. 18 illustrates several operations that a hardware inventory tracker.

FIG. 18 illustrates several operations that the hardware inventory tracker 225 performs periodically to create and maintain its cache of inventoried resources. The tracker 225 starts these operations at the expiration of a timer that it maintains. As shown in FIG. 18, the tracker 225 initially (at 1805) (1) creates an inventory cache when this is the first time that it is performing the operations of FIG. 18 for the current session, or (2) loads the previously created inventory cache after the first iteration of the operations of FIG. 18. As mentioned above, the inventory cache identifies each inventoried hardware resource by a hardware identifier that is generated from the hash of the attributes of the hardware resource.

After creating or loading the cache at 1805, the tracker 225 identifies (at 1810) a list of hardware resources installed on the client computer. In some embodiments, the tracker obtains this list from the OS through a WMI (Windows Management Instrumentation) call that asks the OS for all hardware resources of the client computer.

After 1810, the tracker 225 selects (at 1815) a resource specified by the list identified at 1810. At 1815, the tracker 225 generates a hardware identifier (a hardware inventory D, or HIID) for the resource selected at 1815, based on the hash of the attributes of the selected resource. Next, the tracker uses (at 1820) the generated hardware identifier to determine whether the inventory cache specifies the resource selected at 1815. If so, the tracker transitions to 1830, which is described below. If not, the tracker (at 1820) (1) adds a data entry in the inventory cache for the resource, where the data entry specifies the resource's HIID, and (2) generates a new data item (called an "add data item") that is for directing the server 105 to add the newly inventoried resource to the list of resources that the server maintains for the client computer. In some embodiments, the generated add data item specifies the HIID, class, category, description, friendly name, manufacturer, driver version, driver file size, driver file date, value, and units. FIG. 19 illustrates an example of an add data item for a CPU. As illustrated in this figure, not all the data attributes of an add data item need to be used for a particular resource.

After 1825, the tracker 225 transitions to 1830. At 1830, the tracker determines whether it has examined all the resources specified by the list generated at 1810. If not, it returns to 1815 to select another resource from the list, and to perform the subsequent operations on the newly selected resource. Otherwise, it determines (at 1835) whether each resource that the cache originally specified at 1805 was identified at 1820 as matching one of the resources specified by the list generated at 1810.

If not, the tracker 225 selects (at 1840) a resource that was originally specified by the cache but was not examined at 1820. At 1840, the tracker removes the data entry in the cache for the selected unexamined resource, and then generates a remove data item for this resource. After 1840, the tracker returns to 1835 to determine whether it has now examined at 1820 or 1840 each resource that the cache originally specified at 1805. If not, the tracker transitions to 1840 again to select another unexamined resource, remove its data entry from the inventory cache, and generate its remove data item. Otherwise, when the tracker determines that it has examined each resource originally specified by the cache, the tracker resets (at 1845) the timer that it uses to trigger its inventory operations, and then ends this inventory iteration. The tracker 225 eventually sends all the data items that it generates at 1825 and 1840 to the data filter.

F. Hardware Utilization Tracker

The hardware utilization tracker 220 monitors the use of certain hardware resources 275 of the client computer 115. In some embodiments, this tracker records certain performance characteristics of certain hardware resources over time. For instance, in some embodiments, this tracker records the utilization of the computer's CPU, memory, disk storage, and network adapter over time. Also, in some embodiments, this tracker records the use of the CPU, memory, and network adapter by each individual process.

Figure 21:
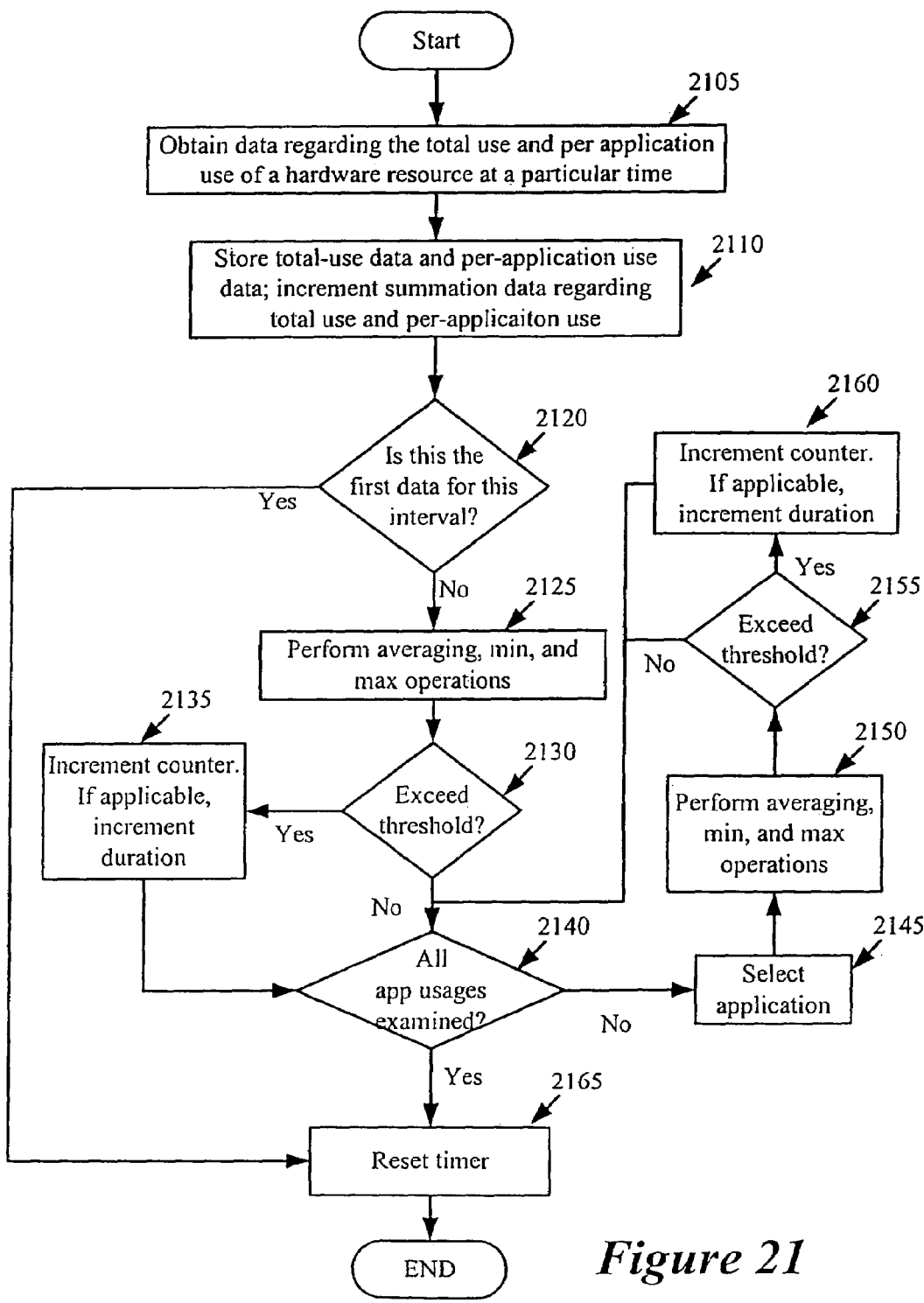
FIG. 21 illustrates a set of operations that a data-gathering engine of the hardware utilization tracker performs.

As illustrated in FIG. 20, the hardware utilization tracker includes a data-gathering engine 2005, a cache 2010, and a data-exporting engine 2015, like the browser and software utilization trackers. For some embodiments of the invention, FIG. 21 illustrates the set of operations that the data-gathering engine 2005 performs to collect usage data for a particular hardware resource. Specifically, in some embodiments, this engine performs these operations to gather information about CPU, memory, or network utilization. Each iteration through the operations illustrated in FIG. 21 gathers information about one particular hardware resource (i.e., gathers information about the CPU, memory, or network card). As further described below, the engine 2005 performs a simpler set of operations for gathering usage data about the client computer's storage.

The set of operations illustrated in FIG. 21 start each time a timer that the gathering engine 2005 maintains expires. As shown in FIG. 21, the hardware utilization tracker initially obtains (at 2105) data regarding the overall use and the per-application use of a particular hardware resource (e.g., the CPU) at a particular time. In some embodiments, the tracker obtains this data from the OS through a WMI (Windows Management Instrumentation) call that asks the OS for data for the particular hardware resource.

For each use that the gathering engine monitors, it specifies a set of attributes in the cache 2005. This set of attributes includes tracking-interval start and end times, a usage value, a min value, and a max value. At 2110, the engine 2005 adds the total-use data obtained at 2105 to a total-use summation value that it stores in the cache 2010. It also adds (at 2110) each particular per application use obtained at 2105 to a summation value that it stores in the cache for the particular per application use. At 2110, the engine 2005 also ensures that each utilization that it obtained at 2105 is specified on a list that it maintains of the utilizations in the current tracking interval.

Next, the engine 2005 determines (at 2120) whether the data obtained at 2105 is the first data obtained for the particular hardware resource during the current tracking interval. If so, the tracker transitions to 2165, which will be further described below. Otherwise, the tracker performs several calculations at 2125. It averages the total use that it obtained for the particular hardware in the current iteration through the operations of FIG. 21, with the total use that it obtained in the iteration that immediately preceded the current one. This engine also determines whether the total use obtained at 2105 is either less than the min or greater than the max recorded for the particular hardware in the cache. If the received total use is less than the recorded min, this engine sets the recorded min to the received total use. If the received total use is greater than the recorded max, this engine sets the recorded max to the received total use.

Next, at 2130, the data-gathering engine 2005 determines whether the average computed at 2125 exceeds a configurable threshold value. One of ordinary skill will appreciate that in some embodiments the threshold determination at 2130 might determine whether a computed average is less than a threshold value.

If the engine determines (at 2130) that the threshold is exceeded, it increments (at 2135) by one a counter that it maintains for the total use. The client application initializes this counter when the client application starts, and the hardware utilization tracker re-initialized this counter at the end of each tracking interval.

If the engine had also detected that the threshold was exceeded during the last iteration through the operations of FIG. 21 for the hardware resource at issue, the engine 2005 also increments (at 2135) a total duration attribute that it stores for the overall use of the hardware resource at issue. It increments this duration by the amount of time since the last instance when this engine performed the operations illustrated in FIG. 21 for the hardware resource at issue. The client application initializes this total duration when the client application starts, and the hardware utilization tracker re-initialized this counter at the end of each tracking interval. From 2135, the engine 2005 transitions to 2140.

The engine also transitions to 2140 from 2130, when it determines that the computed average does not exceed the threshold. At 2140, the engine determines whether it has examined all the received per-application uses of the particular hardware. If not, it selects (at 2145) a received per-application usage. It then averages (at 2150) the per-application use that it obtained for the particular hardware in the current iteration through the operations of FIG. 21, with the per-application use that it obtained in the iteration that immediately preceded the current one. This engine also determines (at 2150) whether the selected per-application use is either less than the min or greater than the max recorded for the selected per-application use of the particular hardware in the cache. If the received total use is less than the recorded min, this engine sets (at 2150) the recorded min to the received total use. If the received total use is greater than the recorded max, this engine sets (at 2150) the recorded max to the received total use.

From 2150, the engine transitions to 2155, where it determines whether the average computed at 2150 exceeds a threshold value for the selected per-application use. If so, it increments (at 2160) by one a counter that it maintains for the selected per-application use. Like the total-use counter, the client application initializes each per-application use counter when the client application start, and the hardware utilization tracker re-initialized each such counter at the end of each tracking interval. If the engine had also detected that the threshold was exceeded during the last iteration through the operations of FIG. 21 for the hardware resource at issue, the engine 2005 also increments (at 2160) a per-application duration attribute that it stores for the selected application's use of the hardware resource at issue. It increments this duration by the amount of time since the last instance when this engine performed the operations illustrated in FIG. 21 for the hardware resource at issue. The client application initializes this per-application duration when the client application starts, and the hardware utilization tracker re-initialized this duration at the end of each tracking interval.

From 2160, the engine 2005 transitions to 2140. The engine also transitions to 2140 from 2155, when it determines that the threshold has not been exceeded. When the engine determines (at 2140) that all the received per-application usages have been examined, it transitions to 2165. At 2165, the engine resets the timer that it uses for performing the tracking operations illustrated in FIG. 21 for the particular hardware resource. It then ends the current iteration of these operations.

Figure 22:
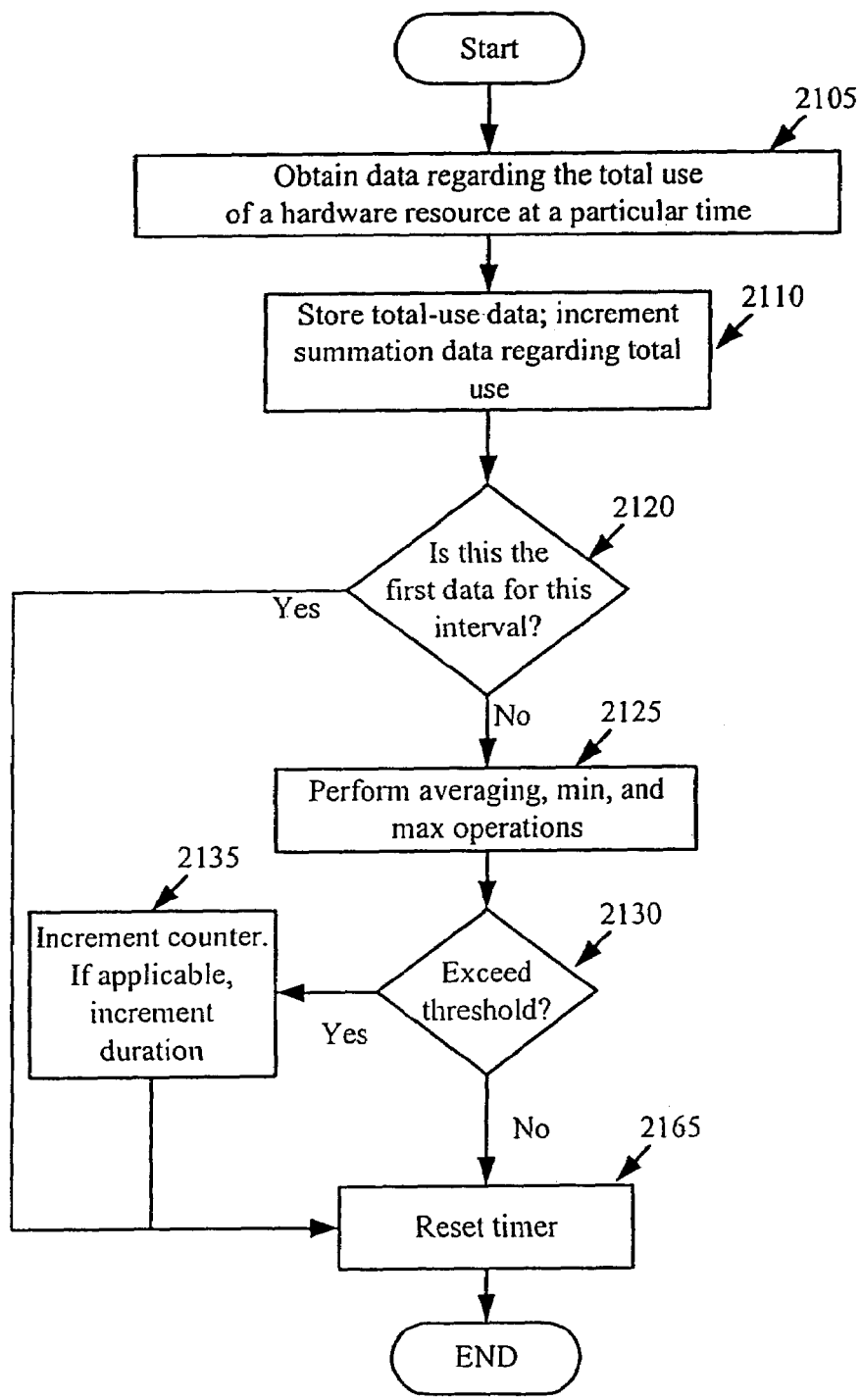
FIG. 22 illustrates a set of operations that the data-gathering engine of the hardware utilization tracker performs for the storage utilization.

FIG. 22 illustrates the set of operations that the engine 2005 performs for the storage utilization. This set is simpler than the set of operations illustrated in FIG. 21. In some embodiments, the data-gathering engine 2005 does not track per-application uses of the storage. Hence, it does not obtain any per-application data at 2105, and does not store or increment any per-application data at 2110. Also, its set of operations for storage-utilization tracking does not include operations 2140–2160. Accordingly, the engine transitions to 2165 from 2135 and from 2130 (when the threshold is not exceeded). The remaining operations illustrated in FIG. 22 are similar to those similarly numbered in FIG. 21, and therefore will not be further described in order not to obscure the description with unnecessary detail.

Figure 23:
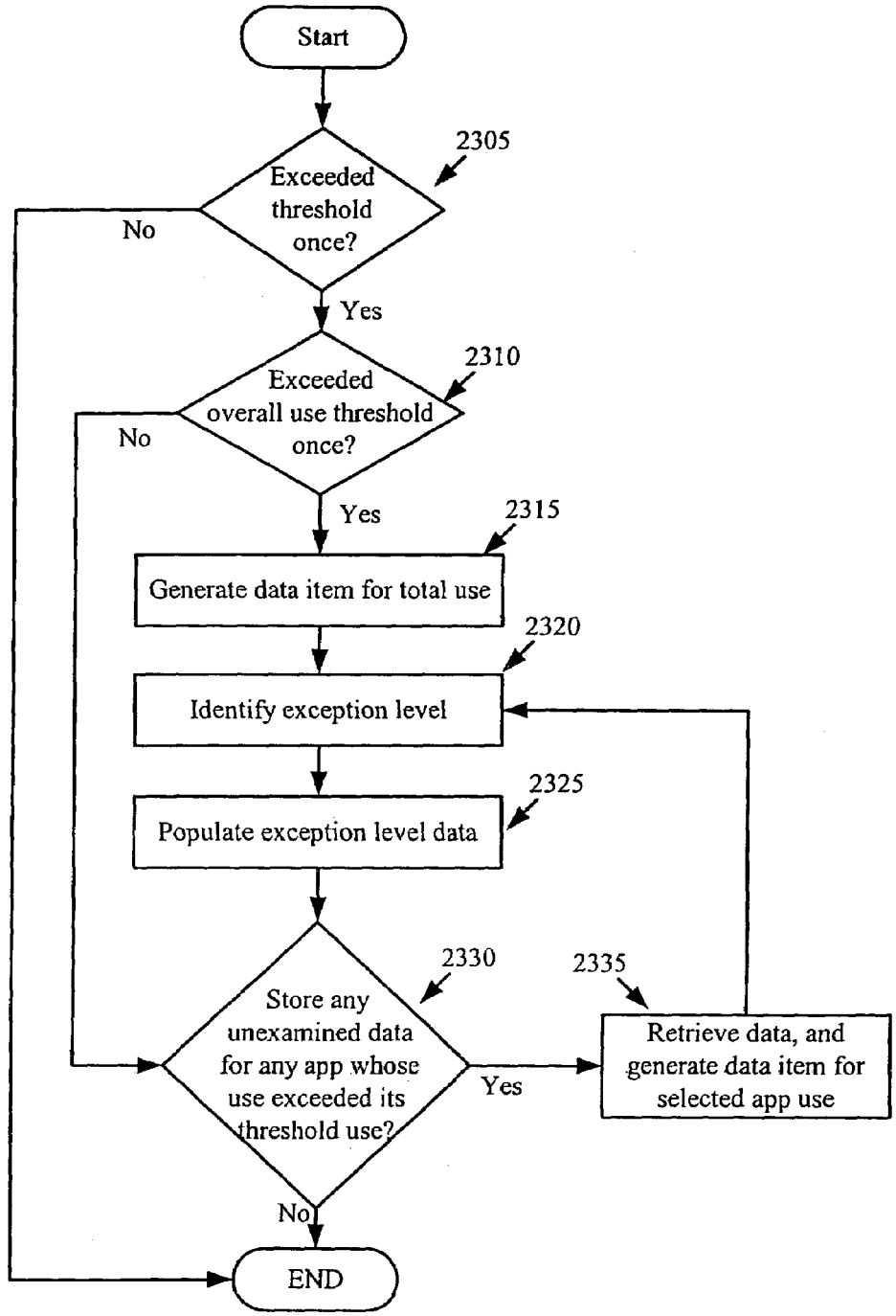
FIG. 23 illustrates several operations that a data-exporting engine of the hardware utilization tracker performs.

The data-exporting engine 2015 reads out the data that the data-gathering engine 2005 stores in the cache 2010. The data-exporting engine reads out this data each time it receives a trigger event from the scheduler. FIG. 23 illustrates several operations that the data-exporting engine 2015 performs each time it receives a notification from the scheduler for a particular hardware device (e.g., for the CPU). Specifically, in some embodiments, this engine performs these operations to export data about CPU, memory, or network utilization. Each iteration through the operations illustrated in FIG. 23 gathers information about one particular hardware resource (i.e., gathers information about the CPU, memory, or network card). As further described below, the engine 2015 performs a simpler set of operations for exporting data about the client computer's storage.

As shown in this figure, the data-exporting engine 2015 initially determines (at 2305) whether the utilization of the hardware resource at issue exceeds a threshold at least once during the tracking interval that just ended. If not, the engine 2015 terminates its operation. Otherwise, it determines (at 2310) whether the overall utilization of the hardware resource exceeds the overall threshold at least once. If not, the engine transitions to 2330, which is described further below.

Otherwise, when the engine 2015 determines that the overall utilization exceeded the overall threshold at least once, it generates (at 2315) a hardware-utilization data item that stores the overall use of the hardware resource that is at issue (e.g., the overall use of the CPU, when this iteration of the operations of FIG. 23 is for exporting collected CPU data).

FIG. 24 illustrates the attributes of a hardware-utilization data item in some embodiments. As shown in this figure, the hardware-utilization data item includes (1) the tracking interval start and stop times, (2) a resource-utilization type (e.g., CPU, or CPU by application), (3) a name for the utilization, (4) the duration, and (5) the average, minimum, and maximum utilization. The engine 2015 retrieves the duration as well as the minimum, and maximum utilization data from the cache 2010. It computes the value of the average attribute by (1) taking the total-use summation value that was created and probably repeatedly incremented at 2110 and (2) dividing it by the duration of the tracking interval. It can also retrieve the tracking interval start and stop times and the resource-utilization name and type from the cache, or it can maintain a record of these parameters itself.

As shown in FIG. 24, the hardware-utilization data item also includes an SIID attribute. When the data item relates to per-application use of a particular hardware resource, the SIID specifies the application that is using the hardware resource. The hardware-utilization data item also specifies exception attributes. The exception attributes include two values, which are: (1) an exception level, and (2) a count value that specifies the number of times that the use exceeded a configured threshold value. Some embodiments might also include the configured threshold value as an exception attribute of the hardware-utilization data item.

The engine 2015 specifies the exception attributes at 2320. Specifically, at 2320, the engine retrieves attributes relating to the exception level from the cache 2010. These attributes are the count and duration that were computed at 2135 by the data-gathering engine. Based on the retrieved count and duration data, the engine specifies an exception level. For instance, some embodiments might specify five exception levels for CPU usage, where each level requires that the CPU utilization exceed its threshold usage a particular number of times for a particular duration.

After identifying the appropriate exception level at 2320, the engine populates (at 2325) the exception attributes (e.g., the exception level and its related count) in the generated data item. It then transitions to 2330. At 2330, it determines whether the cache stores data for any application whose use of the particular hardware resource exceeded the application's threshold use at least once in the last tracking interval (i.e., the tracking interval that just ended).

If so, it generates (at 2335) a hardware-utilization data item that stores the selected application's use of the hardware resource that is at issue (e.g., the word processor's use of the CPU, when this iteration of the operations of FIG. 23 is for exporting collected CPU data). This generated data item is similar to the one generated at 2315, which was described above and illustrated in FIG. 24. One difference is that the data item generated at 2335 includes the SIID of the application selected at 2335. Another difference is that the average attribute specified by the data item generated at 2335 is the average hardware utilization by the selected application. Accordingly, the data-exporting engine computes this value by taking the summation value that was created and possibly incremented at 2110 for the selected application, and dividing it by the duration of the tracking interval. Also, the data-exporting engine computes the exception level of data item generated at 2335 based on the count and duration that the data-gathering engine computed at 2160 for the selected application. The data-exporting engine then records the computed exception level and its related count value in the data item that it generates (at 2335) for the selected application.

From 2335, the engine transitions to 2320 and then to 2325, in order to compute the exception level and then populate the exception attribute in the data item generated at 2335. When the engine 2015 determines that it has examined the utilization data of each application whose use exceeded its threshold value, it terminates the operations illustrated in FIG. 23.

The data exporting engine's operation for exporting storage data items is much simpler. Essentially, as the storage usage does not include per application usage, the engine 2015 only performs the operations 2305, 2315, 2320, and 2325. For the storage data, the engine terminates its operations (1) when it determines at 2305 that the threshold value was not exceeded once, or (2) when it completes its operation at 2325.

One of ordinary skill will understand that other embodiments might specify exceptions for hardware utilization differently. For instance, some embodiments might measure a duration for each contiguous period that a hardware resource is being used above a threshold value. These embodiments might then specify the exception level not only based on the number of times that the threshold is exceed but also based on the duration of each contiguous time period that the use exceeds the threshold value.

G. Data Filter

Figure 25:
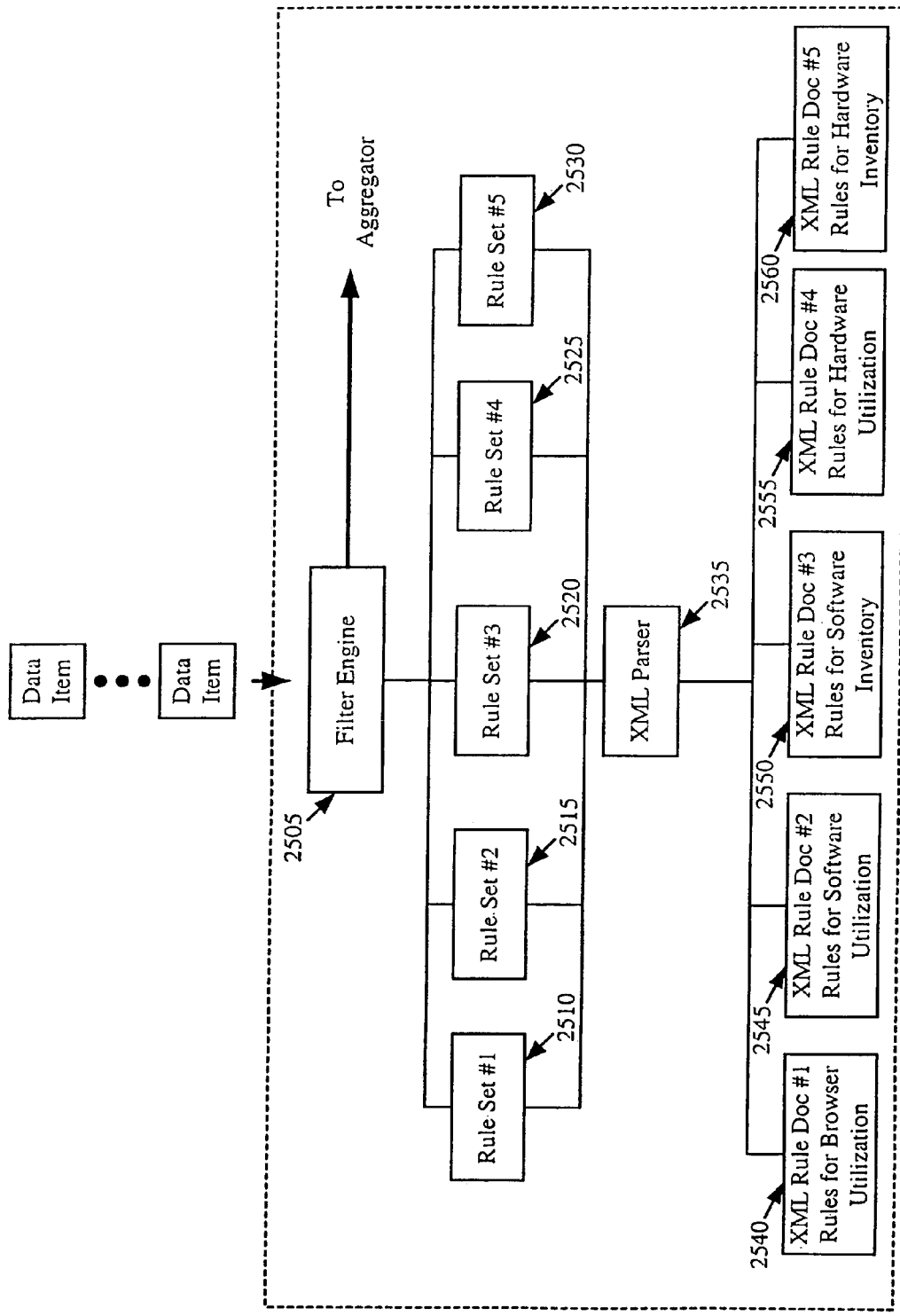
FIG. 25 illustrates the software architecture of a data filter of some embodiments of the invention.

FIG. 25 illustrates the software architecture of the data filter 245 in some embodiments of the invention. As shown in this figure, the data filter 245 includes a filtering engine 2505, five rule sets 2510–2530, an XML parser 2535, and five XML rule documents 2540–2560. Embedded in each XML rule document is one set of rules. Specifically, XML rule document 2540 includes filtering rules for browser utilization data items, XML rule document 2545 includes filtering rules for software utilization data items, XML rule document 2550 includes filtering rules for software inventory data items, XML rule document 2555 includes filtering rules for hardware utilization data items, and XML rule document 2560 includes filtering rules for hardware inventory data items.

The XML parser generates a rule set for each rule document. In some embodiments, it parses out each rule in a rule document and generates a data object that specifies the parsed-out rule. The rule set corresponding to a rule document is the collection of the rule data objects generated from the rule document. The data filter illustrated FIG. 25 embeds the filtering rules in XML documents in order to allow the client application 120 to easily modify its filtering rules. The client application 120 can seamlessly receive XML rule documents, which can be easily parsed out into new filtering rule sets.

The filtering engine 2505 uses the rule sets 2510–2530 to filter the data items that the data filter receives from the browser, software, and hardware trackers 205–225, and then passes the filter data items to the aggregator. This engine uses the rule set 2510 to filter browser utilization data items, uses the rule set 2515 to filter software utilization data items, uses the rule set 2520 to filter software inventory data items, uses the rule set 2525 to filter hardware utilization data items, and uses the rule set 2530 to filter hardware inventory data items.

Figure 26:
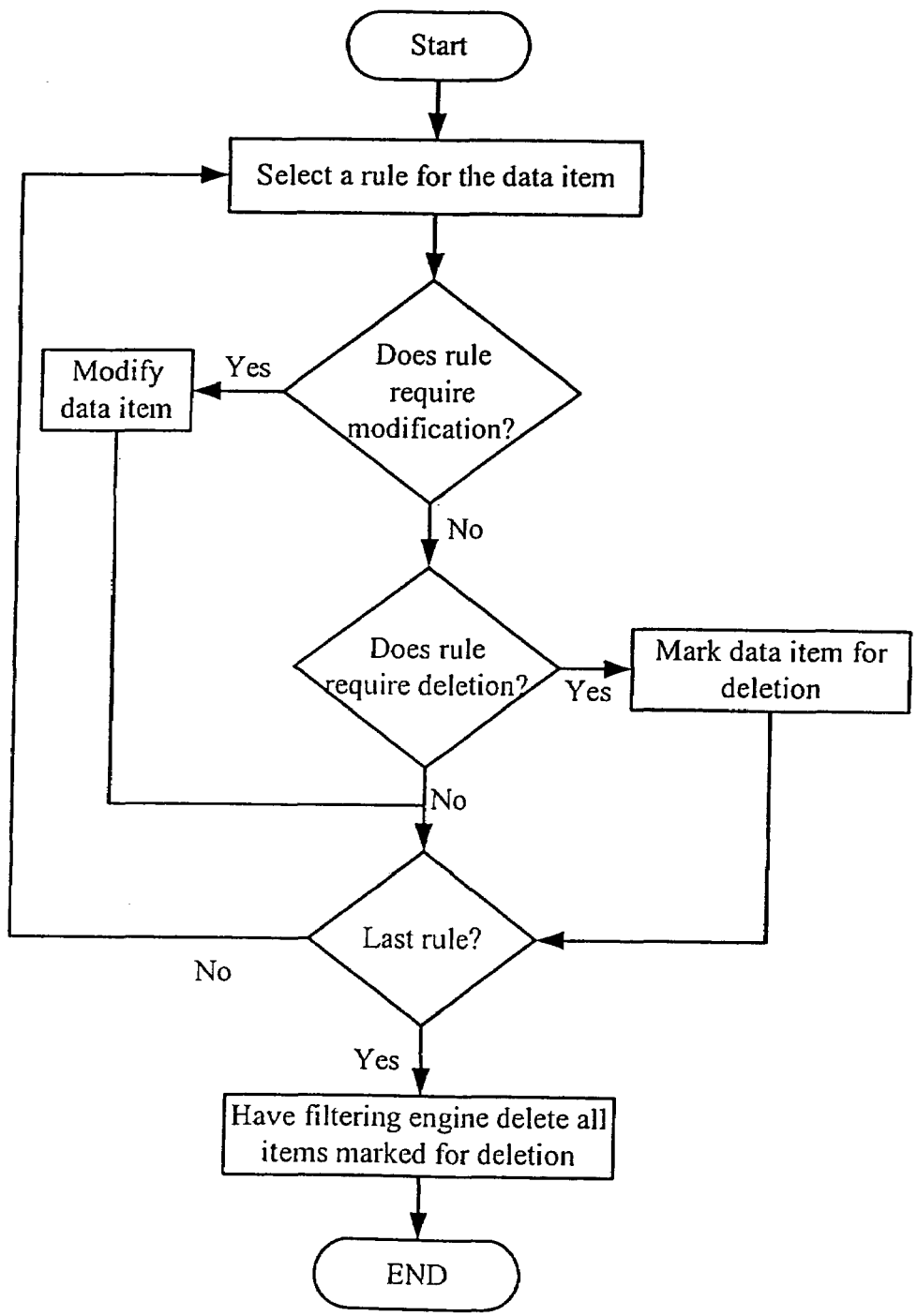
FIG. 26 illustrates a flow of operations of the data filter.

As mentioned above, each rule set includes a number of rules relating to the filtering of the data items for the rule set. In some embodiments, the rules of a rule set can specify the elimination of a data item or the modification of some or all attributes of a data item. The rules might also specify that the filtering engine 2505 needs to pass a data item through to the aggregator without any modifications. In some embodiments, the filtering engine 2505 receives a data item, identifies the appropriate rule set for the data item, sequentially invokes the rules in the identified rule set, and passes the data item to each invoked rule. Each invoked rule then makes no modification to the data item or commands the data item to modify some or all of its attributes, or to mark itself for deletion by the filtering engine. FIG. 26 illustrates one such flow of operations of the data filter.

Examples of filtering operation suggested by a rule include (1) eliminating software utilization and inventory data items that relate to certain SIID's (e.g., filtering out inventory data items relating to back up programs or OS level executables), (2) eliminating hardware inventory data items that relate to unused hardware resources (e.g., unused network adapters), (3) eliminating hardware utilization data items that do not relate to certain monitored metrics (e.g., eliminating data relating to CPU utilization that is less than 20 percent), and (4) modifying browser utilization data items that specify query strings (e.g., replacing a long query string with a shorter one).

Although FIG. 25 illustrates five rule sets that are generated from five rule documents, one of ordinary skill will realize that other embodiments might use fewer or greater number of rule sets and rule documents. For instance, some embodiments use three rule sets that are generated from three rule documents, where one of the rule documents is for browser utilization, one is for software inventory and utilization, and one is for hardware inventory and utilization.

III. Server

A. Architecuture

Figure 27:
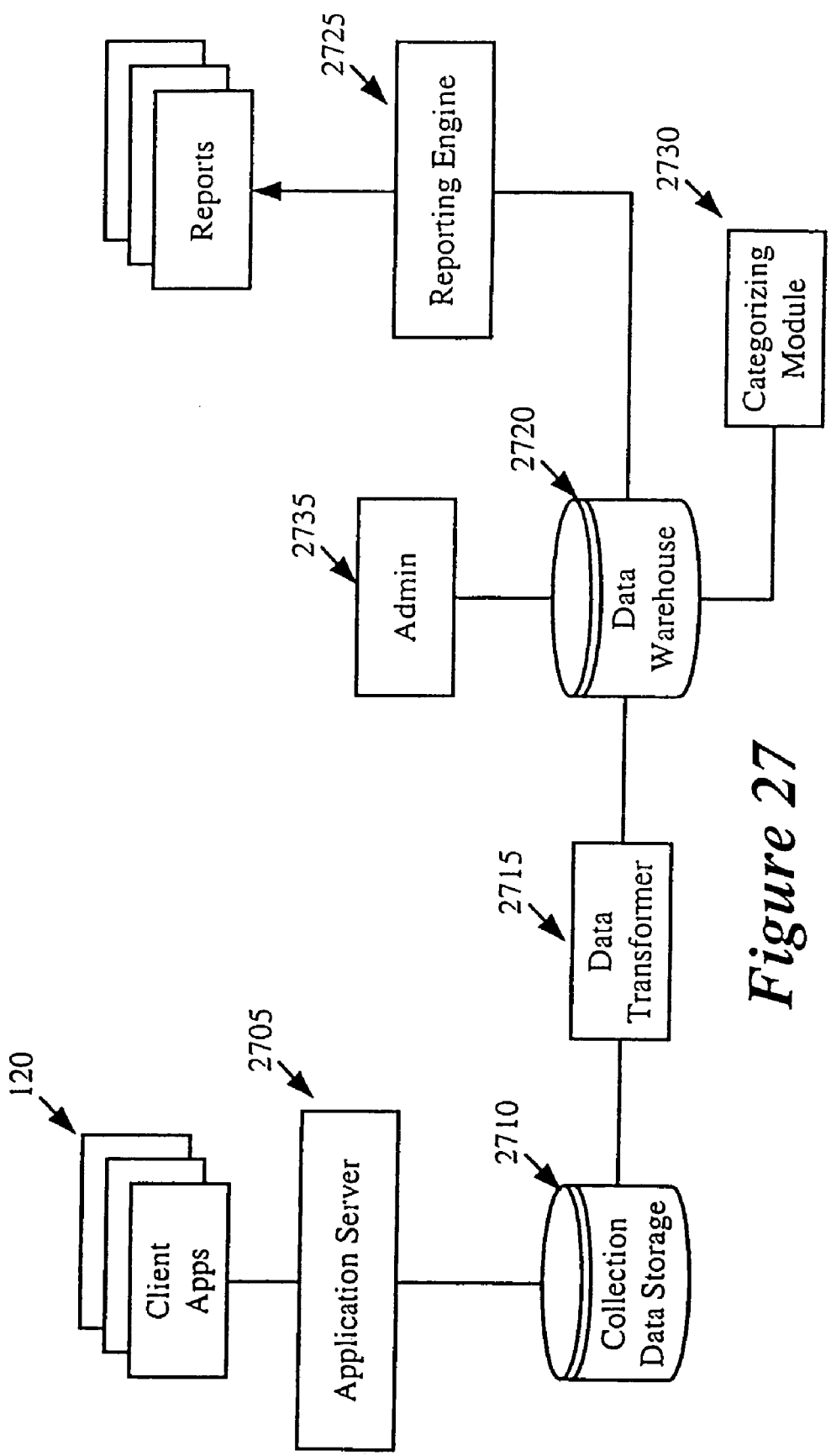
FIG. 27 illustrates the architecture of the server-side software of some embodiments of the invention.

FIG. 27 illustrates the architecture of the server-side software 105 of some embodiments of the invention. In these embodiments, the server 105 includes an application server 2705, a collection data storage 2710, a data transformer 2715, a data warehouse 2720, a reporting engine 2725, and a re-categorizing module 2730. These components of the server can be implemented on one or more computers.

As shown in FIG. 27, the application server 2705 communicates with one or more client applications 120. The application server performs various session services, such as authenticating users that log on at the client computers 115, providing each authenticated client computer with a session ID, maintaining a universal system time, etc. The application server also receives inventory and usage data from the client applications, filters this data, aggregates some or all of the filtered data, and stores the data in the collection data storage 2720. The data transformer 2715 transforms the data stored in the collection data storage into a format that is optimized for efficient querying, analysis, and reporting. The data transformer stores the transformed data in the data warehouse 2720.

The data warehouse includes a category table, which, as further described below, specifies categories that the application server uses to categorize the collected data. A system administrator 2735 can modify the category table's categories that are used during the categorization. The re-categorizing engine 2730 periodically examines the category table, and further modifies the records in this table based on the system administrator's modifications.

The reporting engine 2725 queries the data in the data warehouse 2720, and generates reports based on the queries. In some embodiments, the reporting engine is a commercially available third-party tool, such as the reporting tool of Microstrategy Corporations. In some embodiments, the reporting engine presents its reports through a web browser, such as Internet Explorer. Also, the reporting engine has different querying and reporting options. For instance, it can perform queries and distribute the results of its queries in an automated fashion (e.g., perform queries at pre-determined time intervals and transmit the result via e-mail). Alternatively, the reporting engine can perform queries in response to a direct user request, and can have the user manually direct its delivery of the query results.

B. Collection Data Storage

Figure 28:
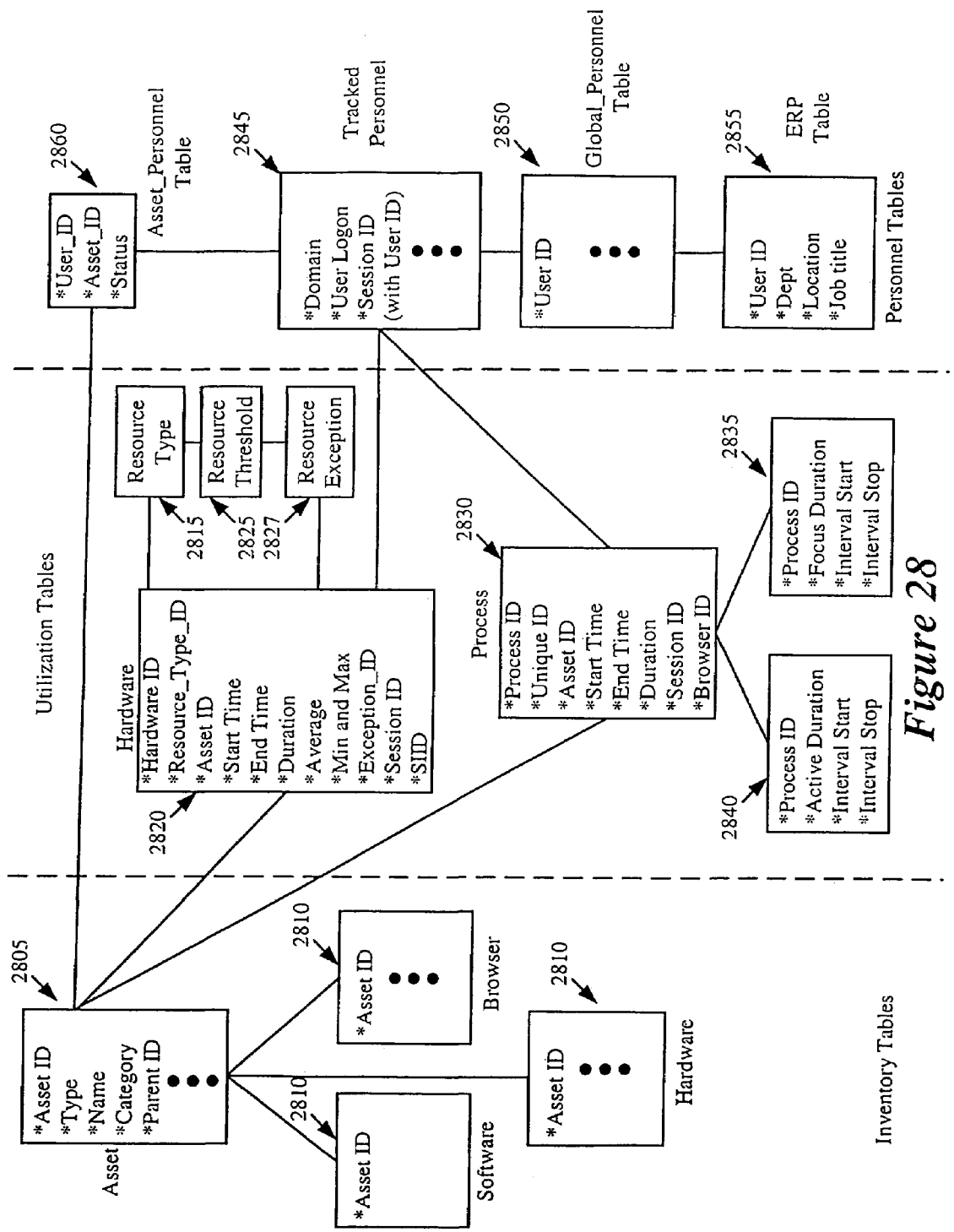
FIG. 28 illustrates the schema of a collection database of some embodiments of the invention.

The collection data storage is a database in some embodiments. FIG. 28 illustrates the schema of this database in some embodiments of the invention. As shown in this figure, this database includes inventory tables, utilization tables, and personnel tables. The inventory tables store inventory data that the client applications gather relating to the hardware, software, and browser resources (i.e., the hardware, software, and browser assets) of their computers. The inventory tables include a primary asset table 2805 that stores attributes used for queries that are applicable across all asset types. Examples of such attributes are an attribute's type, name, category, category ID, and parent category ID. These tables also include, three secondary asset tables 2810, one for software assets, one for hardware assets, and one for browser assets. Each secondary table stores attributes that are unique to its asset type (i.e., the secondary software, hardware, and browser tables store attributes that are unique respectively for software, hardware, and browser assets). Each record in a secondary assets table is associated with a record in the primary asset table through an Asset_ID, which is the identifier for an inventoried asset. In some embodiments, the Asset_ID for a software item is its SIID, for a hardware item is its HIID, and for a browser item is its URL ID.

As shown in FIG. 28, the utilization tables include four hardware tables 2815, 2820, 2825, and 2827 and three process tables 2830–2840. The three process tables are used to store data relating to software utilization and browser events. The three process tables include the primary process table 2830, and the secondary process tables 2835 and 2840.

The primary process table 2830 can store numerous records, where each record corresponds to a browser event or software utilization that the system 100 tracks. Each record specifies a Process_ID, a Unique_ID, an Asset_ID, start and end times, a duration, and a session ID. The Asset_ID is the SIID of the software application or URL ID of the URL event, and it associates the usage data with records in the inventory tables. The Process_ID is an ID that the application server assigns to each new instance of a software utilization or URL event (i.e., assigns each time it receives a start data item from the software or browser tracker of a client). In this manner, the Process_ID uniquely identifies an instance of software utilization or URL event. The Unique_ID of each record in the process table 2830 is the client's Unique_ID for the software utilization or the URL event. Also, the start and end times of each record in the process table are the start and end times that the client application reports in the start and stop data items for the software and URL event of the record. The duration specified by each record in the primary process table 2830 is the total duration of the software utilization or browser event corresponding to the record. The session ID of a record in the process table 2830 is the session ID that the server 105 assigned to the client application 120 that gathered the data stored in the record.

As shown in FIG. 28, the primary process table also includes an attribute that provides the Browser ID. This application server uses this attribute only for browser event. Specifically, when it receives a start data item from the browser tracker of a client application, it extracts the browser ID in the received data item. It then uses the extracted ID to populate the Browser ID attribute of the record in the process table 2830 that it creates for the received browser event.

The secondary process tables 2835 and 2840 can respectively store data regarding the focus and active durations of a software utilization or browser event that is recorded in the primary process table 2730. Each record in a secondary process table is associated with a record in the primary process table 2830 through the Process_ID assigned by the application server. Also, the application server might create multiple records in the secondary process tables 2835 and 2840 for the same software utilization or browser event. Specifically, each time the application server receives an update data item that includes a focus or active duration, the application server creates a new record in the secondary table 2835 or 2840 to store the received focus or active duration. For each such record, the secondary table records the start and stop times of the tracking interval during which the focus or active data was captured. As mentioned above, the client applications report the start and stop times of a tracking interval with the data items that it generates at the termination of the tracking interval.

The hardware table 2820 can store numerous records relating to hardware utilization that the system 100 tracks. Each record specifies a Hardware_ID, Resource_Type_ID, Asset_ID, start time, end time, duration, average, min, max, Exception_ID, session ID, and SIID. The Hardware_ID is an ID that the application server assigns each time it receives a data item from a hardware utilization tracker of a client application. In this manner, the Hardware_ID uniquely identifies an instance of a hardware utilization. A record's session ID is the session ID that the server 105 assigned to the client application 120 that gathered the data stored in the record. The start and end times of each record in the hardware table are the start and end times that the client application reports in the start and stop data items for the hardware utilization of the record. A record's duration in the hardware table 2820 is the duration of the record's corresponding hardware utilization (i.e., the duration reported in the received hardware utilization data item). A record's Asset_ID in the hardware table 2820 is the ID of the computer that contains the record's corresponding hardware resource. This ID is generated by the application server, and it is the parent category ID that is stored in the primary asset table 2805 for the corresponding hardware resource. In this manner, this asset ID associates the hardware utilization data with records of hardware resources in the inventory tables.

A hardware utilization tracker of a client application typically generates multiple data items for a particular hardware item during a session. Several data items would relate to the overall use of the particular hardware item during different tracking intervals in a particular session. Other data items would relate to the per-application use of the particular hardware item in the particular session. Each time the application server receives a data item from a hardware utilization tracker, the application server creates a new record in the hardware table 2820. If the data item is one that relates to a particular software application's use of a particular hardware device, the application server records the particular software application's SIID in the hardware-table record that it creates for the received start data item. The average, min, and max attributes of a record in the hardware table 2820 are the average, min, and max attributes that are reported in the received data item.

The Resource_Type_ID of each record in the hardware table 2820 specifies a particular resource type. The name and usage metric (e.g., time, bytes, etc.) of each resource type are specified in the Resource_Type table 2815. Accordingly, the Resource_Type_ID indexes a record in the Resource_Type table 2815 that specifies the name and usage metric (e.g., time, bytes, etc.) for its particular resource type.

The Exception_ID of each record in the hardware table 2820 indexes a record in the Resource_Exception table 2827, which provides a Resource_Threshold_ID, an Exception_Level, and an Exception_Count for the Exception_ID. The Exception_Count provides the number of times that the threshold was exceeded during the hardware-utilization specified in the corresponding hardware-table record. The Exception_Level and the Exception_Count are provided by the received data item, in some embodiments. In other embodiments, the exception levels are computed at the server, based on exception attributes collected by the client applications.

The Resource_Threshold_ID of an exception record in the exception table 2827 specifies a record in the Resource_Threshold table 2825. The record that this ID indexes provides the configurable threshold parameters for the ID's exception. In some embodiments, these parameters include a size operator (e.g., greater than, or less than), a threshold value (e.g., 10%), and the number of times that the threshold value needs to be crossed before specifying an exception.

The personnel tables include the Tracked_Personnel table 2845, a Global_Personnel table 2850, one or more ERP_Tables 2855, and an Asset_Personnel table 2860. The Tracked_Personnel table 2845 stores a record for each individual that the system tracks. Each record in this table specifies the domain, user logon, session ID, and possibly other system-administration attributes for the record's corresponding individual. In some embodiments, the session ID includes the user ID of the individual.

The Global_Personnel table 2850 stores a record for each individual of an entity that is employing the resource-management system 100. Some of these individuals might not have their resources tracked by the system 100. Also, each individual's record is specified in the Global_Personnel table by a unique user ID. In addition, each individual's record in the Global_Personnel table is associated to one or more records in one or more ERP tables. The ERP tables are typically provided by commercially available ERP tools that allow an entity to store its organizational information. In some embodiments, the ERP table or tables provide the department, location, and job-title for each individual identified in the Global_Personnel table 2850.

The Asset_Personnel table 2860 associates the records of each tracked individual with the records of the assets tracked for the individual. Specifically, for each asset that the individual uses at some point, the Asset_Personnel table stores a record that identifies the individual and the used asset. Each such record specifies the status of the individual's association with the asset. In some embodiments, the status attribute has two values, which are "current" and "removed." The records in the Tracked_Personnel, Global_Personnel, ERP, and Asset_Personnel tables are associated through the user ID's.

C. Application Server

Figure 29:
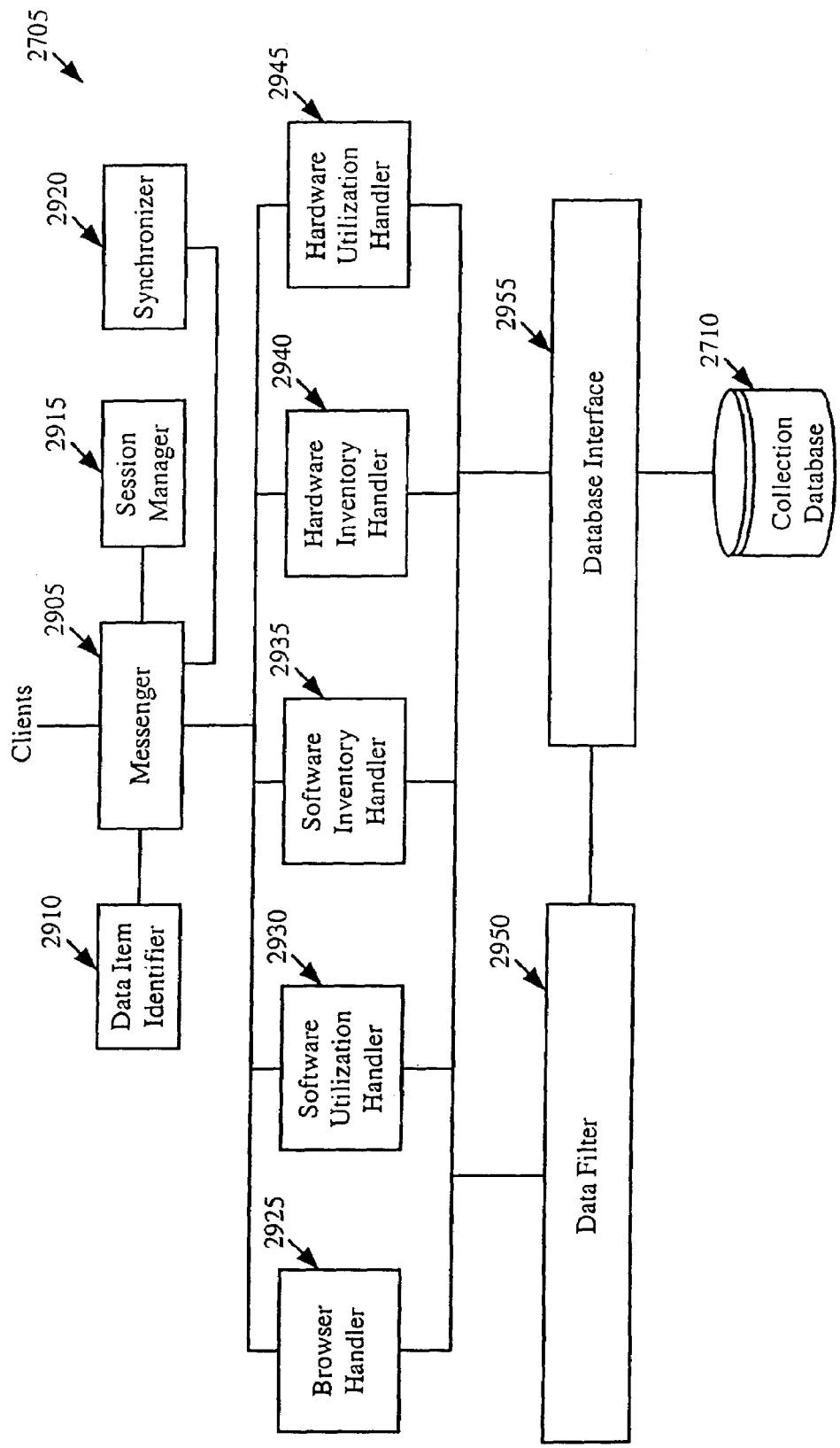
FIG. 29 illustrates the architecture of the application server in some embodiments of the invention.

FIG. 29 illustrates the architecture of the application server 2705 in some embodiments of the invention. In these embodiments, the application server includes a messenger 2905, a data-item identifier 2910, a session manager 2915, a synchronizer 2920, several data handlers 2925–2945, a data filter 2950, and a database interface 2955.

The messenger is a typical transport module for a client/server environment. It is a bi-directional module that receives and transmits data to and from the client applications 120. When a user first logs on to the system, the messenger has the session manager 2915 authenticate the user and generate a session ID for the client application on the user's computer. The messenger then relays the generated session ID to the client application.

From thereon, the client application forwards message lists to the messenger, where each message list includes a session ID and one or more messages containing one or more data items. The messenger then uses the data-item identifier 2910 to identify the type of each data item in the received message list. After identifying a data item's type, the messenger has the appropriate handler for the data item process the data item.

As illustrated in FIG. 29, the application server has five data handlers, which are: the browser handler 2925, the software utilization handler 2930, the software inventory handler 2935, the hardware inventory handler 2940, and the hardware utilization handler 2945. These handlers respectively process data items for browser utilization, software utilization, software inventory, hardware inventory, and hardware utilization. The use of different data handlers for different data types allows the architecture of the application to be extensible. Each time the system 100 has to track a new data type, a new data handler is added to the application server to process the new data items. The five handlers illustrated in FIG. 29 are further described below.

In processing a data item, each handler might generate a new data item and direct the data filter 2950 to filter the new data item. If any portion of the data item remains after the filtering, the data filter or the handler directs the filtered data item to the database interface 2955. This interface then stores the filtered data item in the collection database 2710. Once a data item has been successfully processed (i.e., it has been processed, filtered, and perhaps stored), the handler that processed the data item returns a confirmation to the messenger 2905, which, in turn, returns this confirmation to the client application that forwarded the data item. In some embodiments, the messenger collects in a message list several confirmations for the same client application, so that it can forward several confirmations in one message packet. If the application server has a problem processing a particular data item (e.g., problems in the handling, filtering, or storing of a data item), the application server notifies the client application of its failure, and the reason for its failure, in a message list that it forward to the client application. The client application can then re-transmit its data until it is successfully processed, or until a particular number of attempts are made.

As illustrated in FIG. 29, the application server also includes the synchronizer 2920. This synchronizer maintains the system clock. The schedulers of the client application periodically synchronize their clocks with the system clock. This synchronization can be initiated by the synchronizer or the schedulers.

FIG. 29 illustrates the architecture of the application server for only some embodiments of the invention. One of ordinary skill will realize that other embodiments might employ other architectures and/or other modules. For instance, in some embodiments, the application server also includes a configuration module that communicates with the messenger 2905. This module receives new configuration and filter files from an administrator, and uses these files to configure the modules (e.g., the filter and tracker modules) of the client applications.

1. Software and Hardware Inventory Handlers

Figure 30:
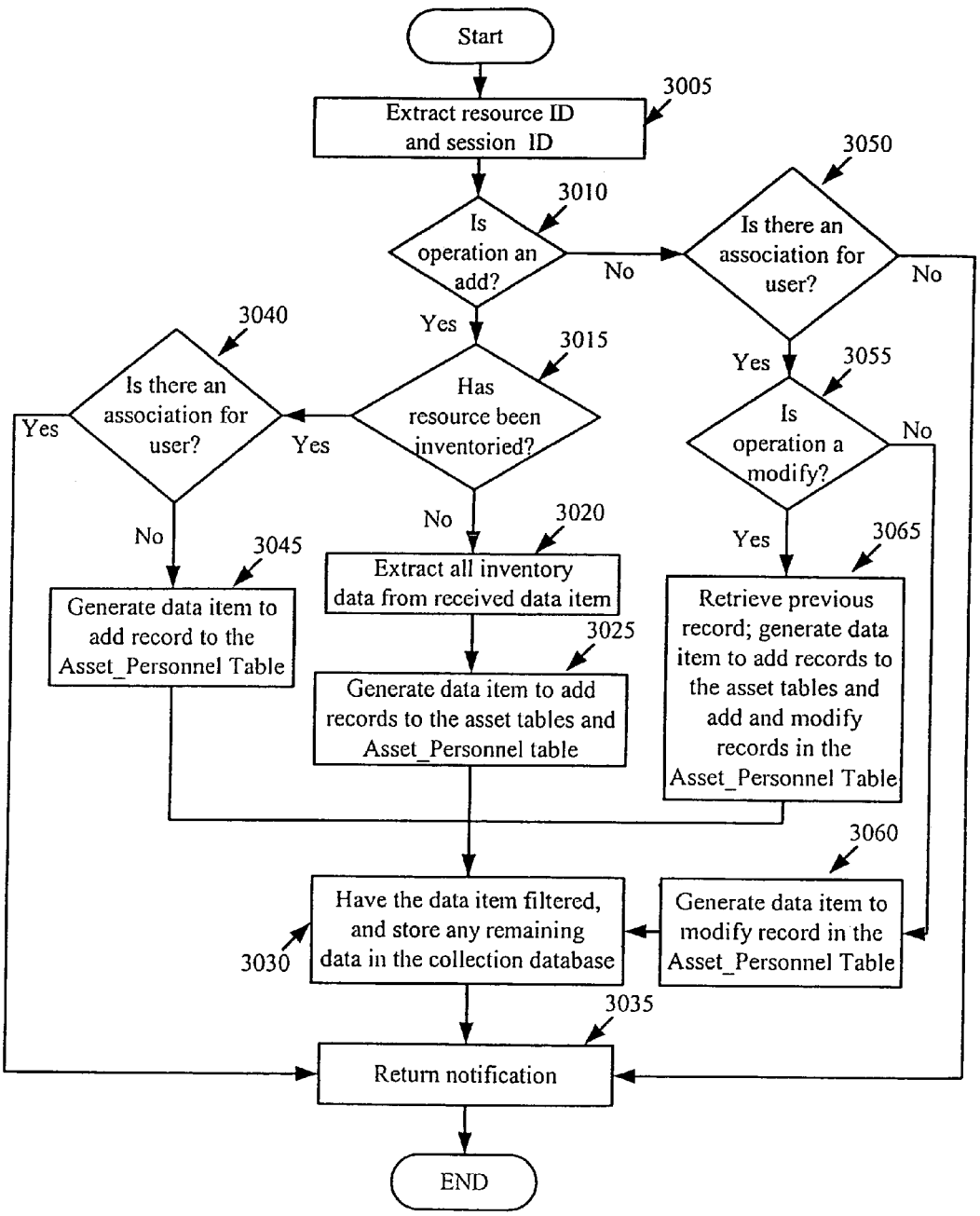
FIG. 30 illustrates several operations that a software inventory handler of some embodiments performs.

FIG. 30 illustrates several operations that the software inventory handler 2935 performs when it receives a data item from the messenger 2905. As illustrated in this figure, the inventory handler 2935 initially extracts (at 3005) the resource ID (i.e., the SIID) and session ID from the received data item. From the extracted the session ID, the handler can obtain the user ID. The handler then determines (at 3010) whether the received data item specifies an add operation. If so, the handler determines (at 3015) whether it has previously inventoried the resource identified at 3005.

If the handler has not previously inventoried the identified resource, it extracts (at 3020) all inventory data that is contained in the received message about the resource. It then generates (at 3025) a data item that specifies that the database interface 2955 needs to add records to the primary asset table 2805 and the secondary software asset table 2810 for the resource identified at 3005. The generated data item provides the resource attributes extracted at 3020, so that the database interface can populate the added records in the asset tables 2805 and 2810. The generated data item also specifies that a record needs to be added to the Asset_Personnel table 2860 to establish an association between the identified-user's records (i.e., the record of the user that was identified at 3005) in the personnel tables 2845–55 and the identified-resource's records (i.e., the records of the resource that was identified at 3005) in the asset tables 2805 and 2810.

Next, at 3030, the handler has the data item generated at 3025 filtered by the data filter 2950. If any portion of the generated data item remains after the filtering, the handler or data filter forwards (at 3030) the generated, filtered data item to the database interface 2955. After 3030, the handler returns (at 3035) a notification to the messenger. This notification might indicate a successful or unsuccessful processing of the received data item. An unsuccessful-processing notification is returned when the database interface 2955 fails to store the filtered data item in the collection database. The handler 2935 also generates an unsuccessful-processing notification when any of the other operations illustrated in FIG. 30 fail. After 3035, the handler terminates its operation.

If the handler determines (at 3015) that it has previously inventoried the resource identified at 3005, it determines (at 3040) whether the Asset_Personnel table 2860 includes a record that associates the identified user and resource (i.e., the user and resource that were identified at 3005). If so, the handler transitions to 3035 to return a notification regarding its processing of the received data item.

If the handler determines (at 3040) that the Asset_Personnel table does not include a record that associates the identified user and resource, the handler generates a data item at 3045. This data item specifies that the database interface 2955 needs to add a record to the Asset_Personnel table 2860 to establish an association between the identified-user's records in the personnel tables 2845–55 and the identified-resource's records in the asset tables 2805 and 2810. The handler then transitions to 3030, which was described above.

If the handler determines at 3010 that the operation is not an add operation, it determines (at 3050) whether the Asset_Personnel table 2860 includes a record that associates the user and resource identified at 3005. If not, the handler transitions to 3035 to return a notification regarding its processing of the received data item. Otherwise, the handler determines (at 3055) whether the received data specifies a modify operation. When the received data specifies a remove operation, the handler transitions to 3060 from 3055. At 3060, the handler generates a data item that specifies that the database interface 2955 needs to modify the record (for the identified user and resource) in the Asset_Personnel table 2860 to reflect the removal of the identified resource. Specifically, this data item would direct the database interface to modify the status attribute in this record to "removed." From 3060, the handler transitions to 3030, which was described above.

When the handler determines (at 3055) that the operation is a modify, it directs (at 3065) the database interface to retrieve the records in the asset tables 2805 and 2810 that correspond to the resource's previous SIID, which is supplied by the update data item. At 3065, the handler then merges the modifications received in the update data item with the retrieved records, and then generates a new data item that directs the database interface to add new records to the primary and secondary asset table 2805 and 2810 for the resource identified at 3005. The generated data item provides the resource attributes that remain after the merging of the received data and retrieved records, so that the database interface can populate the added records in the asset tables 2805 and 2810. The generated data item also specifies that a record needs to be added to the Asset_Personnel table 2860 to establish an association between the identified-user's records in the personnel tables 2845–55 and the newly added resource records in the asset tables 2805 and 2810. The generated data item further specifies that the database interface 2955 needs to modify the status attribute of the previous record (for the identified user and resource) in the Asset_Personnel table 2860 to reflect the removal of the identified resource (i.e., to modify the status attribute in this record to removed). From 3065, the handler transitions to 3030, which was described above.

Figure 31:
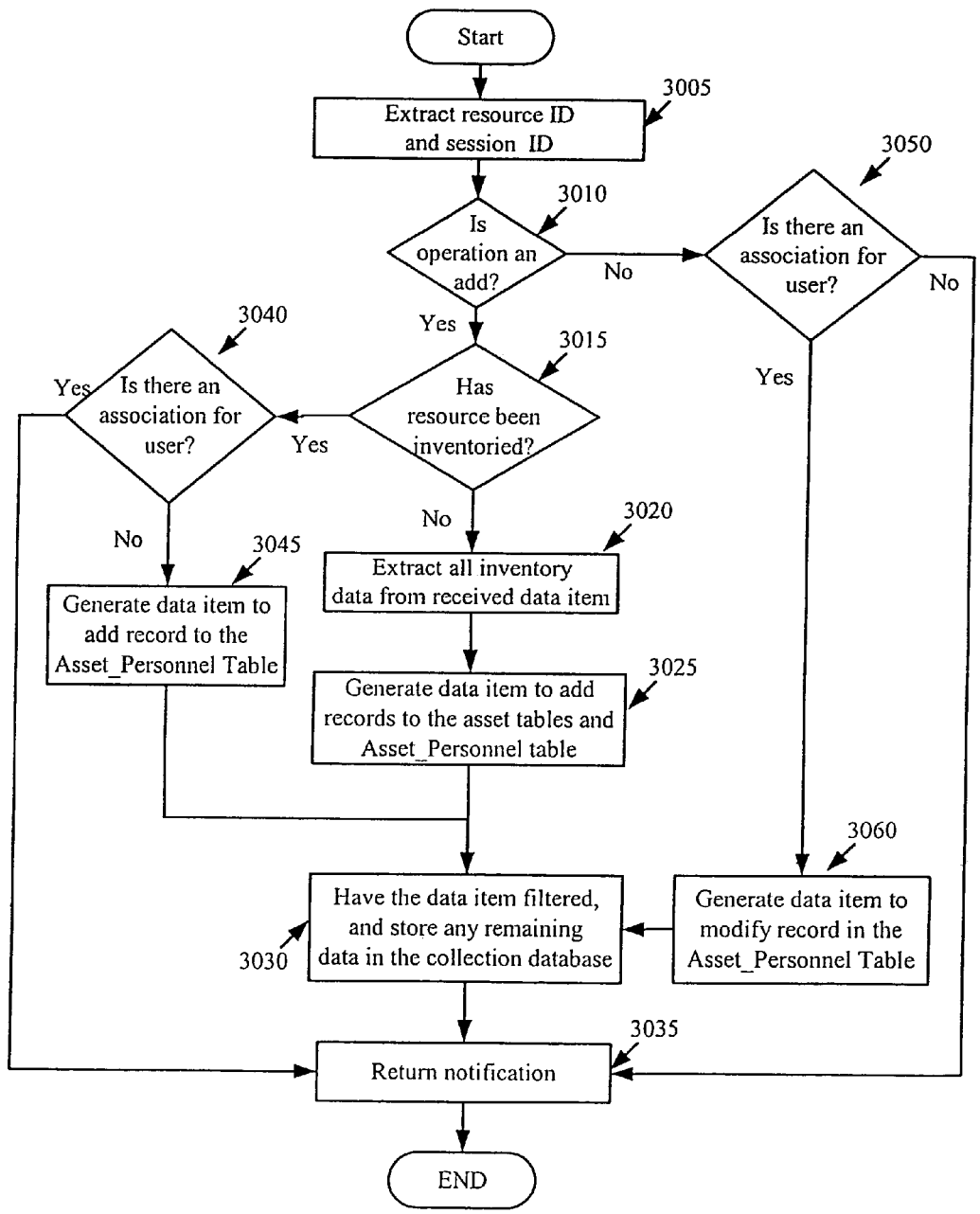
FIG. 31 illustrates several operations that a hardware inventory handler of some embodiments performs.

FIG. 31 illustrates several operations that the hardware inventory handler 2940 performs when it receives a hardware-inventory data item from the messenger 2905. This set of operations is similar to the set of operations illustrated in FIG. 30 for the software inventory handler 2935. There are two differences between the two sets of operations. First, the hardware inventory handler 2940 performs its operations for data items relating to the hardware inventory. Accordingly, the hardware inventory handler creates records in the secondary hardware asset table 2810, and the Asset_ID's of these records are the HIID's and not SIID's. Second, the hardware inventory handler 2940 does not perform the operations 3055 and 3065, as the hardware inventory trackers do not generate data items that specify modifications to the previously inventoried hardware. Hence, if the hardware inventory handler determines (at 3050) that there is an association in the Asset_Personnel table between the user and the hardware resource identified at 3005, the handler transitions to 3060, which was described above. The remaining operations illustrated in FIG. 31 are similar to those similarly numbered in FIG. 30, and therefore will not be further described in order not to obscure the description with unnecessary detail.

2. Software and Browser Utilization Handlers

Figure 32:
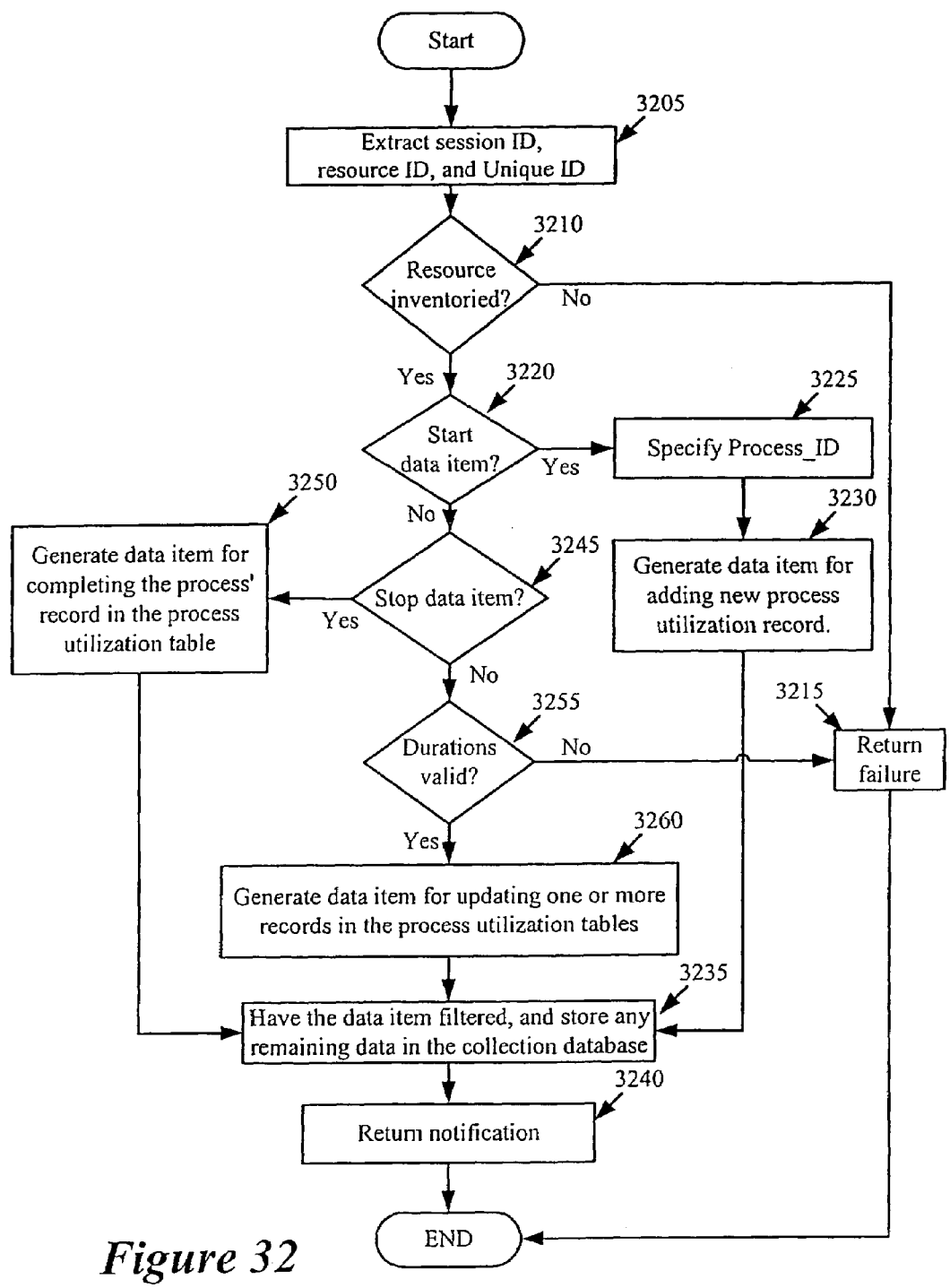
FIG. 32 illustrates several operations that a software utilization handler of some embodiments performs.

FIG. 32 illustrates several operations that the software utilization handler 2930 performs when it receives a data item from the messenger 2905. With the received data item, the handler 2930 receives the tracking-interval start and stop times from the messenger. As illustrated in FIG. 32, the utilization handler 2930 initially extracts (at 3205) from the received data item (1) the session ID, (2) the resource ID (i.e., SIID), and (3) the Unique_ID. Next, the handler determines (at 3210) whether it has inventoried the software resource specified by the extracted SIID (i.e., whether the asset tables include one or more records with an Asset_ID that matches the extracted SIID). If not, the handler returns (an 3215) an error to the client application through the messenger 2905, and then terminates its operation.

Otherwise, the handler determines (at 3220) whether the received data item is a start data item that specifies the start of the utilization of a particular software resource. If so, the handler specifies (at 3225) a Process_ID that it will use to keep track of this reported utilization instance of the particular software resource. Next, the handler generates (at 3230) a data item that directs the database interface 2955 to add a new record to the primary process utilization table 2830. The generated data item specifies that this record's (1) Process_ID is the ID specified at 3225, (2) Asset_ID, session ID, and unique ID are respectively the SIID, session ID, and unique ID extracted at 3205, and (3) start time is the start time specified in the received data item. The generated data item also directs the database interface to initialize the duration field of the new record in the primary process utilization table.

Next, at 3235, the handler has the data item generated at 3230 filtered by the data filter 2950. If any portion of the generated data item remains after the filtering, the handler or data filter forwards (at 3235) the generated, filtered data item to the database interface 2955. After 3235, the handler returns (at 3040) a notification to the messenger. This notification might indicate a successful or unsuccessful processing of the received data item. An unsuccessful-processing notification is returned when the database interface 2955 fails to store the filtered data item in the collection database; otherwise, a successful-processing notification is returned. After 3240, the handler 2930 terminates its operation.

If the handler determines (at 3220) that the data item is not a start data item, it determines (at 3245) whether this data item is a stop data item. If the received data item is not a stop data item, it must be an update data item. An update data item always specifies a process duration and sometimes specifies a focus duration and/or an active duration.

Accordingly, when the handler determines (at 3240) that the received data item is not a stop data item, it performs a duration validity check operation at 3255. This checking operation is to ensure that the duration of any active or focused period reported by the received update data item is valid. In some embodiments, this checking operation ensures that the following three conditions are met. First, the focus duration has to be less than the tracking duration, where the tracking duration is the difference between the tracking-interval stop and start times received from the messenger. Second, the active duration has to be less than the tracking duration. Third, the focus duration cannot be less than the active duration.

If all three conditions are met, the handler determines (at 3255) that the reported focus and/or active durations are valid, and transitions to 3260, which is further described below. However, if either of the first two conditions is not met, the checking operation specifies that the received update data item does not specify valid active and/or focus durations. In this situation, the handler returns (an 3215) an error to the client application through the messenger 2905, and then terminates its operation. On the other hand, when both of first two conditions are met, but the third one is not, the handler (at 3255) sets the active duration equal to the focus duration, and then specifies that the reported focus and active durations are valid. It then transitions to 3260.

At 3260, the handler generates a data item that directs the database interface 2955 to modify one or more records in the process utilization table for the received data item's process. Specifically, the generated data item specifies the Unique_ID and session ID that were extracted at 3205. The data interface 2955 can use these two ID's to identify the record in the process utilization table 2830 for the received data item's software process. The generated data item directs the database interface to add the process duration specified by the received data item to the duration attribute of the identified record in the primary process utilization table 2830.

When the received data item specifies a focus duration, the data item generated at 3260 will also direct the database interface (1) to create a new record in the focus process table 2835, (2) to store the received focus duration and the received tracking-interval start and stop times in this record, and (3) to store the Process_ID (i.e., the ID of the record in the primary process table 2830 that specifies session and unique ID's that match the session and unique ID's in the received data item) in this record. Similarly, when the received data item specifies an active duration, the generated data item will also direct the database interface (1) to create a new record in the active process table 2840, (2) to store the received active duration and the received tracking-interval start and stop times in this record, and (3) to store the Process_ID in this record. After 3260, the handler transitions to 3235, which was described above.

If the handler determines (at 3245) that the received data item is a stop data item, it generates (at 3250) a data item that directs the database interface 2955 to modify the record in the primary process utilization table 2830 for the received data item's software process. Specifically, the generated data item specifies the Unique_ID and session ID that were extracted at 3205, in order to allow the database interface to identify the record in the process utilization table 2830 for the received data item's software utilization. The generated data item directs the database interface to set the end time specified by the received data item as the end time of the identified record in the primary process table 2830. After 3250, the handler transitions to 3235, which was described above.

Figure 33:
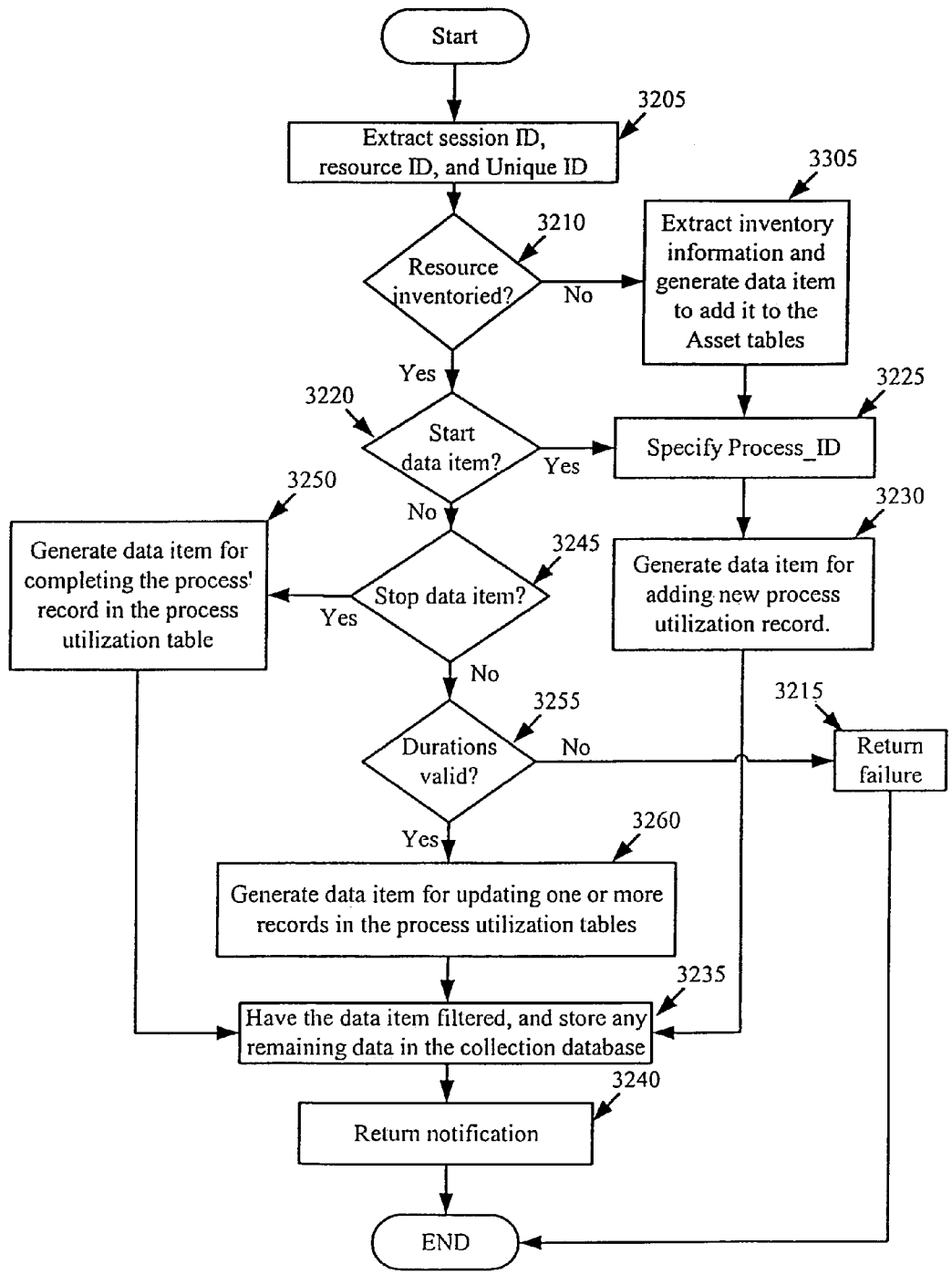
FIG. 33 illustrates several operations that a browser handler of some embodiments performs.

When the browser handler 2925 receives a browser data item from the messenger 2905, the handler performs a set of operations that is illustrated in FIG. 33. This set is similar to those illustrated in FIG. 32. There are only a few differences between the two sets of operations. For instance, the resource ID that the browser handler extracts at 3205 is the URL ID.

Also, when the browser handler determines (at 3210) that it has not inventoried the resource identified by the extracted URL ID, it transitions to 3305 instead of 3215. At 3305, the browser handler extracts the inventory data in the received data item. This inventory data includes the Browser ID, URL, and possibly header information. The engine then (at 3305) generates a data item that directs the database to create records to the primary and secondary asset tables 2805 and 2810, and populate these records with the extracted URL and header information.

After this data item is generated, the browser handler transitions to 3225 from 3305, since the received data item must be a start data item. As mentioned above, the browser handler specifies (at 3225) a Process_ID for the newly received URL event, and then generates (at 3230) a data item that directs the database interface to add a record to the process table 2830 for the newly received URL event. The data item generated at 3230 also directs the interface to populate the Browser ID attribute of this record with the browser ID extracted at 3305. From 3230, the browser handler transitions to 3235 to filter both the data items generated at 3305 and 3230. The remaining operations illustrated in FIG. 33 are similar to those similarly numbered in FIG. 32, and therefore will not be further described in order not to obscure the description with unnecessary detail.

3. Hardware Utilization Handler

Each time the hardware utilization handler receives a data item from the messenger, it creates a record in the hardware-utilization table 2820 and a record in the exception table 2827. It then populates each of these records with the data that it extracts from the received data item. It also populates these tables with the appropriate indices to the other tables. The attributes of these tables and how they relate to the attributes of the received data item were described above in Section III.B. After populating these records, the hardware utilization handler returns a notification to the messenger regarding the completion of its task.

4. Data Filter

The server data filter 2950 has an identical architecture to the architecture of the client data filter 245. In other words, FIG. 25 illustrates not only the architecture of the client data filter 245 but also illustrates the architecture of the server data filter 2950. The only difference between the two architectures is that while the data from the filtering engine 2505 goes to the aggregator 250 in case of the client data filter 245, the data from the filtering engine 2505 goes either to the database interface 2955 or to the data-source handler in case of the server data filter 2950.

Also, like the client data filter 245, the server data filter 2950 performs the filtering operations illustrated in FIG. 26. Specifically, for each data item that the filter 2950 receives from a particular handler, the filter identifies the appropriate rule set for the particular handler, sequentially invokes the rules in the identified rule set, and passes the data item to each invoked rule. Each invoked rule then either (1) makes no modification to the data item, or (2) commands the data item to modify some or all of its attributes or to mark itself for deletion.

There are several reasons for performing filtering at both the client and server environments. For instance, in some embodiments, the client filters discard data that should not be collected; the server can then be adaptively configured to choose selectively the collected data that is to be discarded. Also, the filtering at the server can often be immediately modified, whereas filtering at the client might not be immediately modifiable due to delays in deployment of the client filter documents 2540–2560.

In addition to its filtering operation, the server data filter 2950 performs a categorization operation. The server data filter 2950 performs the categorization operation each time it receives an inventory add data item for a new software resource or a start data item for a URL event. This operation identifies the category attribute that is stored in the primary asset table 2805 for a software resource or for a URL event.

Figure 34:
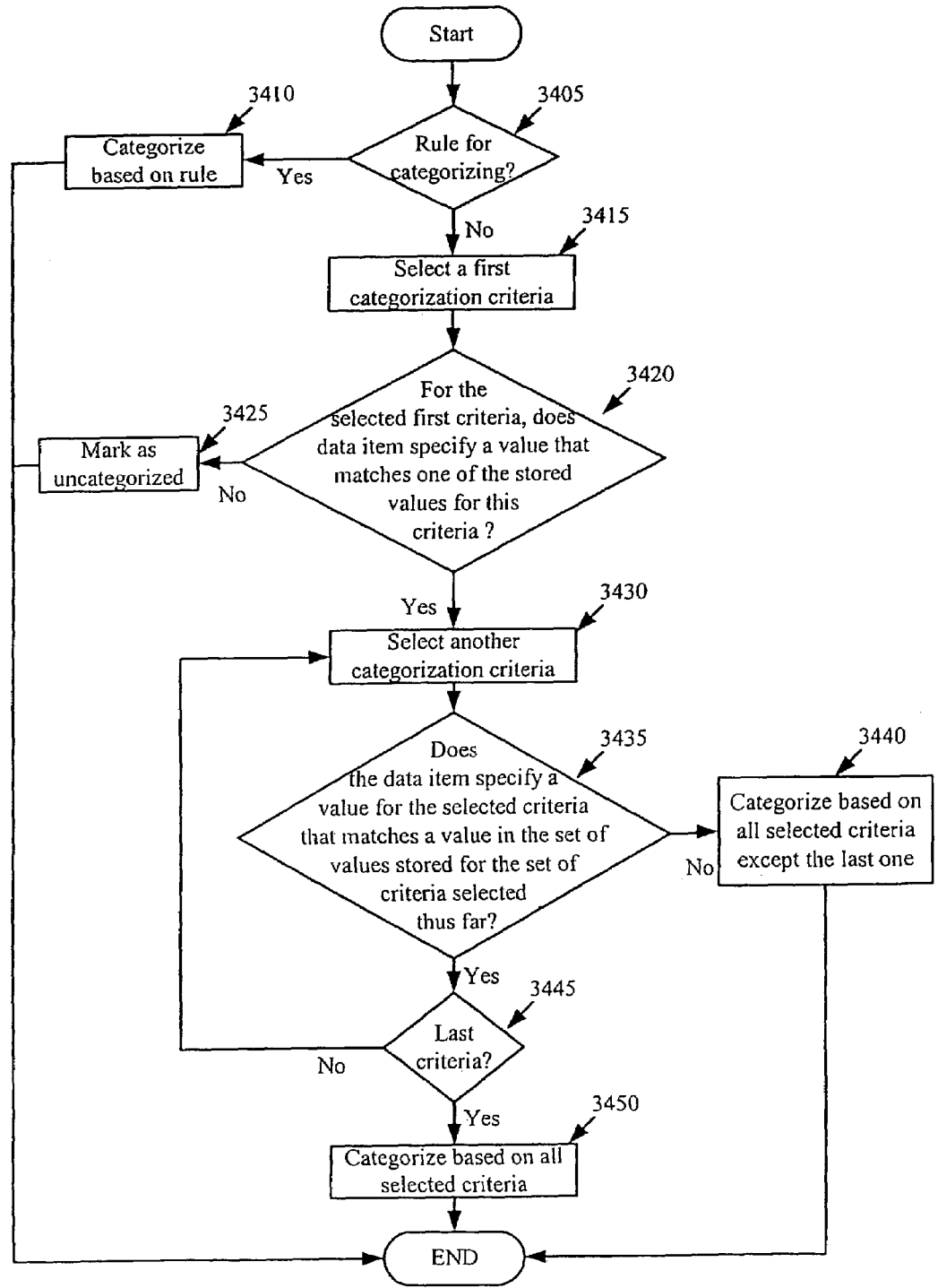
FIG. 34 presents a conceptual illustration of the categorization operation of a server data filter.

FIG. 34 presents a conceptual illustration of the categorization operation of the server data filter 2950. The filter performs these operations when an inventory handler supplies to it a data item regarding a newly inventoried software resource, or when the browser handler supplies to it a data item for a new URL event. The operations illustrated in FIG. 34 are embedded in the XML filter documents for the inventory and browser handlers. Accordingly, in the embodiments, the server data filter 2950 performs the operations illustrated in FIG. 34 as part of its filtering engine's invocation of the rules in the rule set of the appropriate handler.

As illustrated in FIG. 34, the server data filter 2950 initially determines (at 3405) whether the rule set has a rule that specifies a category attribute for the inventoried resource or URL event. If so, the filter sets (at 3410) the category of the inventory or URL add data item to the attribute specified by the rule. Otherwise, the filter selects a first categorization criteria at 3415. It then determines (at 3420) whether the receive data item specifies a value for the selected first criteria that matches a value that the data filter stores for the first selected criteria. If not, the filter sets (at 3425) the category attribute of the created Asset_Table record to "uncategorized."

On the other hand, when the data filter 2950 determines (at 3420) that the received data item specifies a matching value for the selected first criteria, the data filter selects another categorization criteria at 3430. Next, at 3435, the filter determines whether the data item specifies a value for the criteria selected at 3430 that matches a value in a set of values that the data filter stores for the set of criteria selected thus far. If not, the filter sets (at 3440) the category attribute of the created Asset_Table record based on all selected criteria except the one that was selected last at 3430. After 3440, the filter 2950 terminates its categorization operation.

If the filter identifies a matching value at 3435, the filter determines (at 3445) whether it has examined all the categorization criteria. If not, it transitions back to 3430 to select another categorization criteria. When the filter determines (at 3445) that it has examined all the categorization criteria, the filter sets the category attribute (at 3450) of the created at Asset_Table record based on all selected criteria. The filter then terminates its categorization operation.

Figure 35:
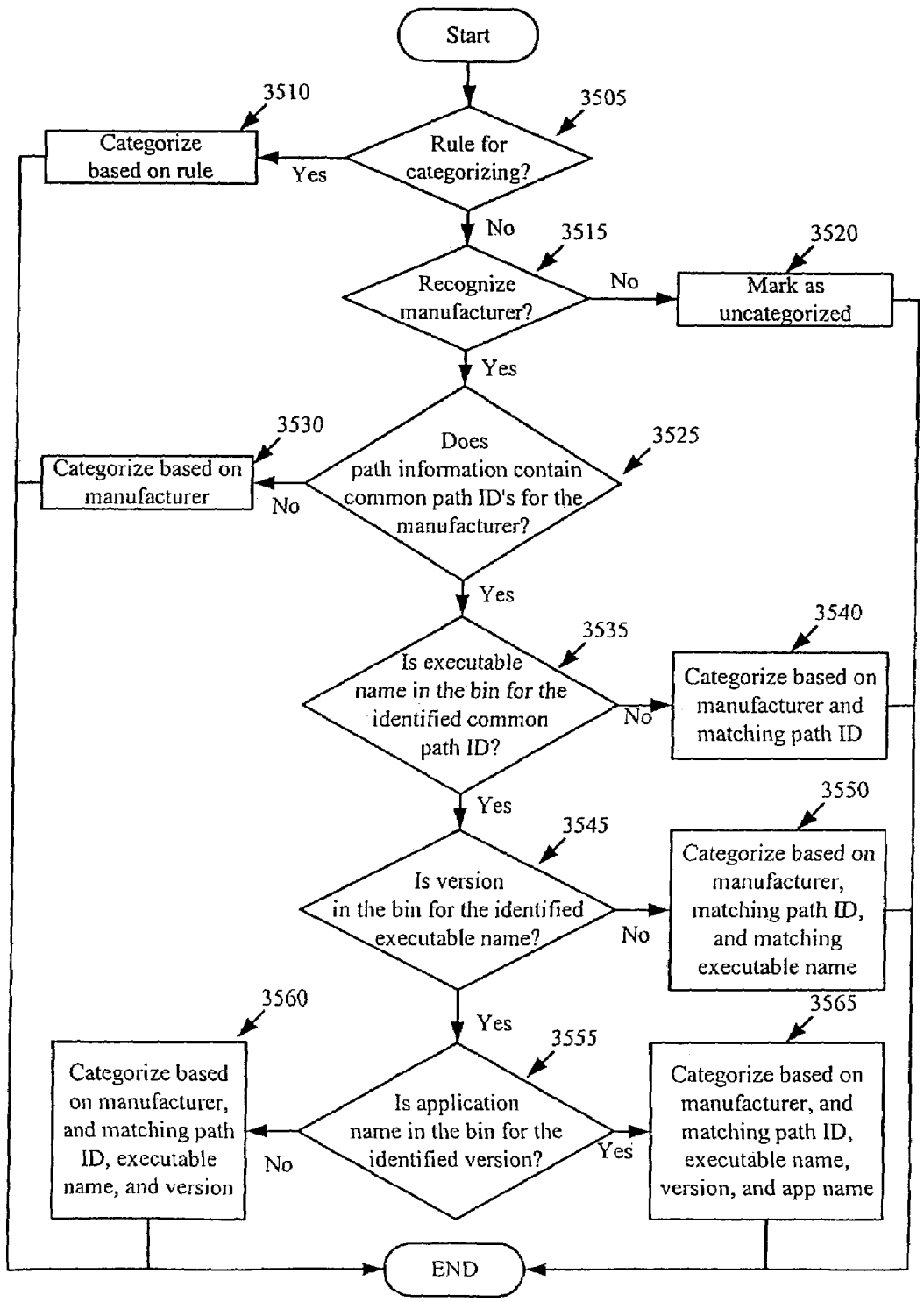
FIG. 35 presents a more detailed example of the categorization operations that the server data filter performs in some embodiments.

FIG. 35 presents a more detailed example of the categorization operations that the filter 2950 performs in some embodiments when it receives an add inventory data item for a new software resource. As shown in this figure, the data filter initially determines (at 3505) whether the software inventory handler's rule set has a rule that specifies a value for the category attribute of the record that is created in the primary asset table for the received add data item. If so, the filter sets (at 3510) the category attribute to the value specified by the rule.

Otherwise, the filter determines (at 3515) whether the start data item specifies a manufacturer identity that matches a manufacturer identity that the filter stores. If not, the filter sets (at 3520) the category attribute of the created Asset_ Table record to "uncategorized." Otherwise, the filter determines (at 3525) whether the received data item specifies path-information that matches any path data in the set of common path data that the filter stores for the manufacturer identified at 3515. If not, the filter specifies the category attribute of the primary-asset-table record according to the manufacturer identified at 3515. For instance, if Microsoft is the identified matching manufacturer, the filter might set the category attribute to "a Microsoft product."

On the other hand, when the filter identifies matching path data at 3525, it determines (at 3535) whether the received data item specifies an executable name that matches a name in the set of executable names that the filter stores for the manufacturer identified at 3515 and the path data identified at 3525. If not, the filter specifies (at 3540) the category attribute of the primary-asset-table record according to the matching manufacturer and path data. For instance, the filter might set the category attribute to "Microsoft office" when the identified manufacturer and path information are Microsoft and programs/MSoffice.

If the filter identifies a matching executable name at 3535, it determines (at 3545) whether the received data item specifies a version that matches one of the versions specified in the filters storage for the manufacturer identified at 3515, the path data identified at 3525, and the executable name identified at 3535. If not, the filter specifies (3550) the category attribute of the primary-asset-table record according to the matching manufacturer, path data, and executable name. For instance, the filter might set the category attribute to "Microsoft office/.xsl" when the identified manufacturer, path information, and executable name are Microsoft, programs/MS office, .xsl.

If the filter identifies a matching version at 3545, it determines (at 3555) whether the received data item identifies an application name that matches one of the names specified in the filter storage for the manufacturer identified at 3515, the path data identified at 3525, the executable name identified at 3535, and the version identified at 3545. If not, the filter specifies (at 3560) the category attribute of the primary-asset-table record according to the matching manufacturer, path data, executable name, and version. For instance, the filter might set the category attribute to "Microsoft office/.xsl/v. 5.0" when the identified manufacturer, path information, executable name, and version are Microsoft, programs/MS office, .xsl, and version 5.0.

On the other hand, if the filter identifies a matching application name at 3555, the filter specifies (at 3565) the category attribute of the primary-asset-table record according to the matching manufacturer, path data, executable name, version, and application name. For instance, the filter might set the category attribute to "Microsoft Excel, version 5.0" when the identified manufacturer, path information, executable name, version, and application name are Microsoft, programs/MS office, .xsl, version 5.0, and Excel.

In some embodiments, the set of operations that the filter 2950 performs to categorize a new URL event is similar to the flow illustrated in FIG. 35. In these embodiments, however, one difference between the two sets of operations is that the URL categorization examines the URL (that is specified in the received start URL data item) in order to identify the manufacturer, path data, executable name, version ID, and application name. Another difference is that the URL categorization determines before 3515 whether the URL is an internal or external URL. If the URL is an external one, the filter examines the received external URL in view of one or more categorization criteria (that are not illustrated in FIG. 35) in order to specify a category for the received URL. If the URL is an internal one, the filter performs a set of operations similar to 3515–3565.

D. Data Warehouse

The collection database stores inventory and utilization records that can be analyzed along different temporal and organizational dimensions. However, these records are not optimally organized for efficient querying and analysis. Accordingly, as mentioned above, the data transformer 2715 (1) transforms the data stored in the collection database 2710 into a format that is optimized for efficient reporting and analysis, and (2) stores the transformed data in the data warehouse 2720.

Figure 36:
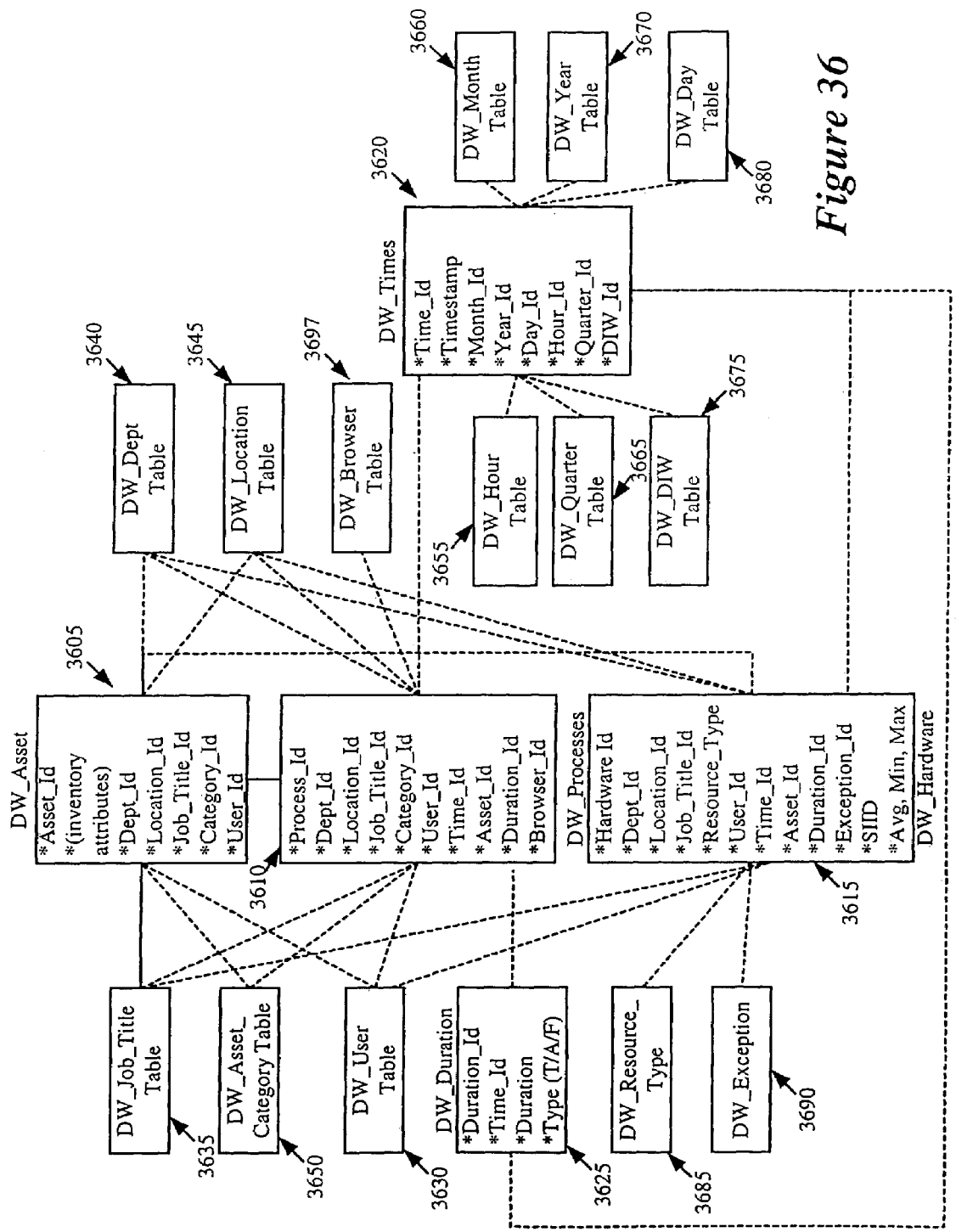
FIG. 36 illustrates the schema for a data warehouse.

In some embodiments, the data warehouse employs a star schema that has several fact tables that store several types of data that are useful for querying and analyzing along different dimensions. FIG. 36 illustrates one such schema, which includes five fact tables for five types of data. The five types are inventoried assets, software and browser utilization, hardware utilization, time periods, and usage durations.

The five fact tables are (1) the DW_Asset table 3605 for storing inventory data, (2) the DW_Process table 3610 for storing software and browser usage data, (3) the DW_Hardware table 3615 for storing hardware usage data, (4) DW_Times table 3620 for storing temporal data regarding software, browser, and hardware usage, and (5) DW_Duration table 3625 for storing duration data regarding software, browser, and hardware usage.

Each record in the asset table 3605 has an Asset_ID. Each record also includes several asset attributes (such as name, etc.) like the asset tables 2805 and 2810 of the collection database. Also, each record in the process and hardware tables 3610 and 3615 has an Asset_ID index that associates the record with a record in the asset table 3605.

The records in the data warehouse asset, process, and hardware tables 3605–3615 have indices that associate these tables with four tables that store organization dimension attributes. These four tables are (1) the DW_User table 3630 for identifying all tracked personnel of an organization, (2) the DW_Job_Title table 3635 for specifying different job titles in the organization, (3) the DW_Department table 3640 for specifying different departments in the organization, and (4) the DW_Location table 3645 for specifying different locations (e.g., addresses) of the organization. The data transformer 2715 populates these four tables and the associated indices in the asset, process, and hardware tables based on organization dimension attributes from the ERP table 2855.

Each record in the process table 3610 also includes a Browser_ID index. This index associates each URL-event record that is specified in the process table 3610 with a record in a browser table 3697, which provides information about the browser that was used for the particular URL event.

Each record in the asset and process tables 3605 and 3610 includes a Category_ID index that associates the record with a record in a DW_Asset_Category table 3650. Each record in the category table 3650 specifies a category by having a field for the Category_ID and a field for the category name. Some embodiments use a hierarchical category scheme, which allows each category to belong to one or more parent and grandparent categories. Accordingly, for these embodiments, each record in the category table also specifies the Category_ID of each parent category of the category specified by the record. This allows the inventory and usage data in tables 3605 and 3610 to the queried at different levels in the categorization hierarchy. Some embodiments allow an administrator to modify the categorization hierarchy. For these embodiments, the server-side architecture illustrated in FIG. 27 includes a categorizing module 2730 that periodically examines the records in the category table 3650 and corrects any parent Category_ID that needs to be modified to reflect modifications to the categorization hierarchy that were made by the administrator.

Each record in the process and hardware tables 3610 and 3615 includes a Duration_ID index that associates the record with a record in the DW_Duration table 3625. The DW_Duration table associates each Duration_ID with a duration value and a type. The duration type can be total, focus, or active. Accordingly, the duration type specifies whether the duration data specified for a record in the process or hardware table 3610 or 3615 relates to a measured total duration, a measured focus duration, or a measured active duration. In some embodiments, the data transformer 2715 creates one record in the process table to record the total duration of a process. It also creates one record in the process table for each active or focus duration record in the collection database tables 2835 and 2840. In these embodiments, the data transformer also creates one record in the hardware table for each record in the collection database table 2820.

The DW_Duration table also associates each Duration_ID with a Time_ID index into the DW_Times table 3620. Each record in the process and hardware tables 3610 and 3615 also includes a Time_ID index that associates the record with a record in the DW_Times table 3620. The DW_Times table associates each Time_ID with a timestamp that specifies the start time of the corresponding process or hardware utilization. This table also associates each Time_ID with month, year, day, hour, quarter, and day-in-week ID's. These six IDs associate each Time_ID with six tables that store temporal dimension attributes. These six tables are (1) the DW_hour table 3655 for specifying all hours a day, (2) the DW_Month table 3660 for specifying all months in a year, (3) the DW_Quarter table 3665 for specifying all quarters in a year, (4) the DW_Year table 3670 for specifying several years, (5) the DW_DIW table 3675 for specifying a number for a day in a week, and (6) the DW_Day table 3680 for specifying all days in a week.

Each record in the hardware table 3615 also includes an SIID, an average, a min, and a max. These attributes are similar to the similar attributes in the hardware table 2870 in the collection database. The hardware table 3615 also includes (1) a Resource_Type_ID index into a DW_Resource_Type table 3685, which lists the difference resource types, and (2) an Exception_ID index into a DW_Exception table 3690, which includes a record for each different exception type. The tables 3685 and 3690 are similar to the above-described tables 2815 and 2827.

As mentioned above, the reporting engine 2725 queries the data in the data warehouse 2720, and generates reports based on the queries. In some embodiments, the reporting engine is a commercially available third-party tool, such as the reporting tool of Microstrategy Corporations. A typical query is a search for data along one or more dimensions. Accordingly, the reporting engine typically performs a query by first identifying the appropriate ID's in the dimension tables, and then using the identified ID's to identify the records in the fact tables that store the desired factual data. The records that are identified in some fact tables might require the reporting engine to query data in other fact tables. The data in the fact tables can then be manipulated (e.g., summed) to generate some or all of the data in the reports.

For example, assume that the query is for active use of Microsoft word in July 2001 by the finance department. Accordingly, the reporting engine's query string will first identify (1) the month and year ID's for July and 2002 from the month and year tables 3660 and 3670, and (2) the department ID from the department table 3640. The identified department ID is used to search for each record in the asset table 3605 that has that department ID, and has as the asset name Microsoft Word. Each such record will have a particular asset ID. Next, the month and year ID are used to identify time ID's. The identified time and asset ID's are then used to identify one or more records in the process table 3610.

Each identified record in the process table 3610 has a duration ID, which identifies a duration record in the duration table 3625. Accordingly, the records in the duration table that specify an active duration, and that correspond to the identified records in the process table can then be identified. The duration of these records (in the duration table) can then be aggregated to provide an aggregate value for the active use of Microsoft word in July 2002 by the finance department. Of course, this data does not need to be aggregated, or might be aggregated in smaller pieces. For instance, if the query required that the active use be illustrated on a daily basis, the collected data for each day could be aggregated and displayed.

As mentioned above, in some embodiments, the reporting engine presents its reports through a web browser, such as Internet Explorer. Also, the reporting engine has different querying and reporting options. For instance, it can perform queries and distribute the results of its queries in an automated fashion (e.g., perform queries at pre-determined time intervals and transmit the result via e-mail). Alternatively, the reporting engine can perform queries in response to a direct user request, and can have the user manually direct its delivery of the query results.

IV. Computer Architecture

Figure 37:
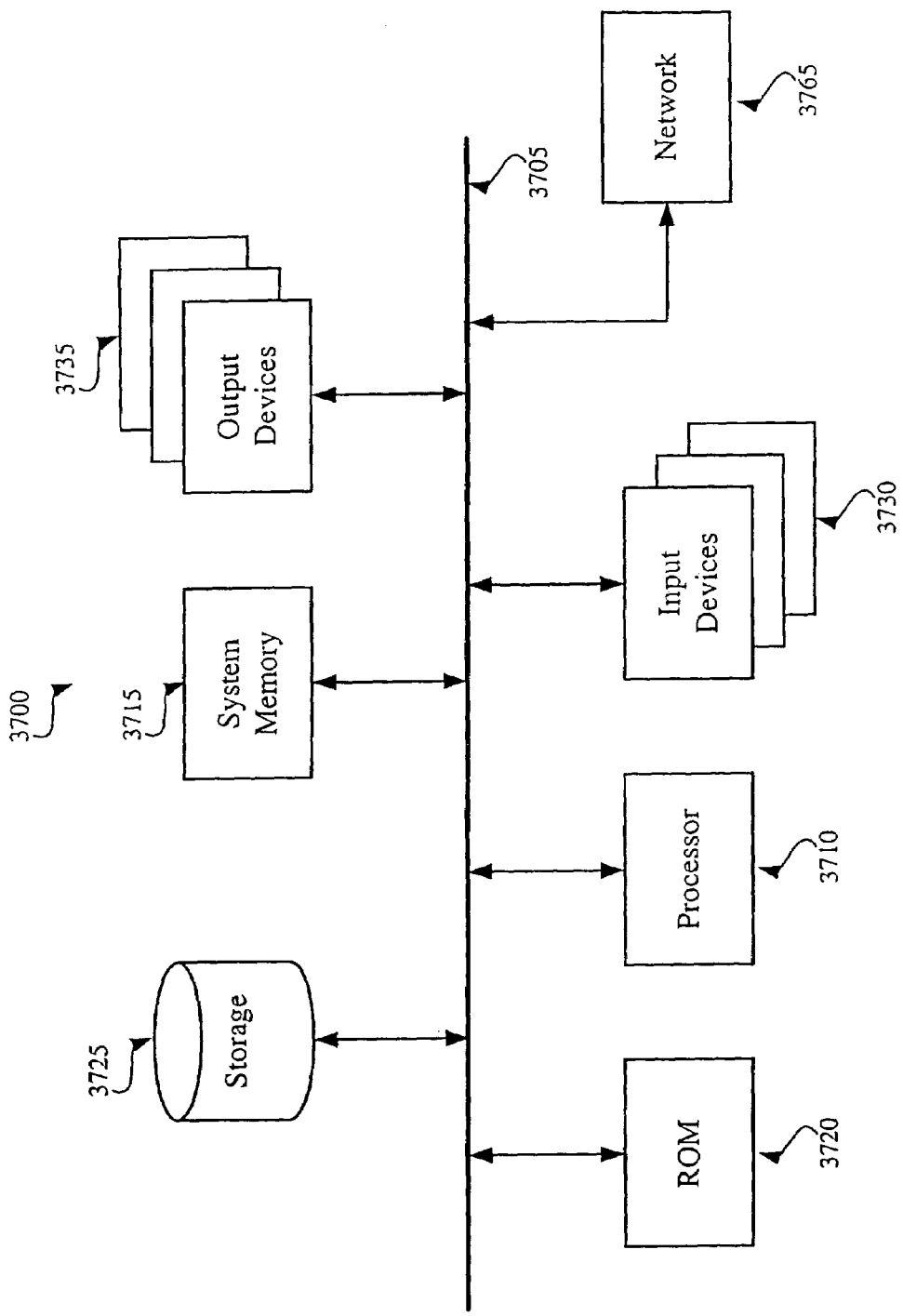
FIG. 37 illustrates a conceptual block diagram of a computer.

FIG. 37 conceptually illustrates the basic components of a computer that can serve as a server or client computer of the resource management system 100. This computer 3700 includes a bus 3705, a processor 3710, a system memory 3715, a read-only memory 3720, a permanent storage device 3725, input devices 3730, and output devices 3735.

The bus 3705 collectively represents all system, peripheral, and chipset buses that communicatively connect the numerous internal devices of the computer system 3700. For instance, the bus 3705 communicatively connects the processor 3710 with the read-only memory 3720, the system memory 3715, and the permanent storage device 3725.

From these various memory units, the processor 3710 retrieves instructions to execute and data to process in order to execute the processes of the invention. The read-only-memory (ROM) 3720 stores static data and instructions that are needed by the processor 3710 and other modules of the computer system. The permanent storage device 3725, on the other hand, is read-and-write memory device. This device is a non-volatile memory unit that stores instruction and data even when the computer system 3700 is off. Some embodiments of the invention use a mass-storage device (such as a magnetic or optical disk and its corresponding disk drive) as the permanent storage device 3725. Other embodiments use a removable storage device (such as a floppy disk or zip® disk, and its corresponding disk drive) as the permanent storage device.

Like the permanent storage device 3725, the system memory 3715 is a read-and-write memory device. However, unlike storage device 3725, the system memory is a volatile read-and-write memory, such as a random access memory. The system memory stores some of the instructions and data that the processor needs at runtime. In some embodiments, the invention's processes are stored in the system memory 3715, the permanent storage device 3725, and/or the read-only memory 3720.

The bus 105 also connects to the input and output devices 3730 and 3735. The input devices enable the user to communicate information and select commands to the computer system. The input devices 3730 include alphanumeric keyboards and cursor-controllers.

The output devices 3735 display images generated by the computer system. For instance, these devices display IC design layouts. The output devices include printers and display devices, such as cathode ray tubes (CRT) or liquid crystal displays (LCD).

Finally, as shown in FIG. 37, bus 3705 also couples computer 3700 to a network 3765 through a network adapter (not shown). In this manner, the computer can be a part of a network of computers (such as a local area network ("LAN"), a wide area network ("WAN"), or an Intranet) or a network of networks (such as the Internet).

Any or all of the components of computer system 3700 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, the client applications in some embodiments might communicate with the application server through e-mails. Also, some embodiments might not associate the usage data with the user data. For example, these embodiments might only track the usage data by itself.

Also, other embodiments might aggregate the duration data differently than the embodiments described above. Thus, one of ordinary skill in the art would understand that the invention is not to be limited by the foregoing illustrative details, but rather is to be defined by the appended claims.

We claim:

1. A system for tracking utilization of resources of computers, the system comprising:
   a) a plurality of client computers, wherein each computer has at least one software resource that the system tracks;
   b) a client application for each client computer, each client application for collecting utilization duration data relating to the utilization of the at least one software resource of the application's corresponding client computer; and
   c) an application server for receiving the utilization duration data collected by the client applications and for storing the received data in a storage structure; wherein at least one collected duration data provides an estimated amount of time that a software resource was in focus, wherein a software resource is in focus when the software resource is the designated software resource for receiving input.

2. The system of claim 1, wherein at least some of the collected duration data relate to the utilization of software resources of the client computers.

3. The system of claim 1, wherein each collected duration data provides an estimated duration of the utilization of a software resource.

4. The system of claim 3, wherein at least one collected duration data provides an estimated amount of time that a software resource is active.

5. The system of claim 4, wherein a software resource is active when the software resource receives input at a frequency that is greater than a threshold frequency.

6. The system of claim 1, wherein at least some of the collected duration data relate to the utilization of hardware resources of the client computers.

7. The system of claim 6, wherein each of a plurality of collected duration data provides an estimate of the amount of time that the utilization of a hardware resource has crossed a particular threshold utilization value.

8. The system of claim 1, wherein at least some of the collected duration data relate to the utilization of hardware resources by particular software resources of the client computers.

9. The system of claim 8, wherein each of a plurality of collected duration data provides an estimate of the amount of time that the utilization of a particular hardware resource by a particular software resource has crossed a particular threshold utilization value.

10. The system of claim 1, wherein at least some of the client computers include browsers, wherein at least some of the client applications detect browser events, wherein at least some of the collected duration data relate to browser events.

11. The system of claim 10, wherein each duration data that relates to a browser event provides an estimated duration for the browser event.

12. The system of claim 11, wherein some of the detected browser events are URL events.

* * * * *